(12) United States Patent
Yerramalli et al.

(10) Patent No.: US 12,250,166 B2
(45) Date of Patent: Mar. 11, 2025

(54) DYNAMIC SWITCH BETWEEN SS-TWR AND DS-TWR FOR SIDELINK POSITIONING

(71) Applicant: QUALCOMM Incorporated, San Diego, CA (US)

(72) Inventors: Srinivas Yerramalli, San Diego, CA (US); Piyush Gupta, Bridgewater, NJ (US); Xiaoxia Zhang, San Diego, CA (US); Alexandros Manolakos, Escondido, CA (US); Rajat Prakash, San Diego, CA (US); Junyi Li, Fairless Hills, PA (US); Mukesh Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 17/645,390

(22) Filed: Dec. 21, 2021

(65) Prior Publication Data
US 2023/0198700 A1    Jun. 22, 2023

(51) Int. Cl.
H04L 5/00      (2006.01)
H04W 72/0446   (2023.01)

(52) U.S. Cl.
CPC ....... *H04L 5/0048* (2013.01); *H04W 72/0446* (2013.01)

(58) Field of Classification Search
USPC ........................................ 370/329
See application file for complete search history.

(56) References Cited

U.S. PATENT DOCUMENTS

| 2011/0117926 | A1* | 5/2011 | Hwang | H04W 64/00 |
| | | | | 455/456.1 |
| 2021/0297206 | A1* | 9/2021 | Manolakos | H04W 72/20 |
| 2021/0352605 | A1* | 11/2021 | Manolakos | H04W 56/001 |
| 2022/0365163 | A1* | 11/2022 | Baek | H04W 4/40 |
| 2023/0056831 | A1* | 2/2023 | Manolakos | H04L 5/0048 |

FOREIGN PATENT DOCUMENTS

| WO | 2021086114 A1 | 5/2021 |
| WO | 2021188220 A1 | 9/2021 |

OTHER PUBLICATIONS

International Search Report and Written Opinion—PCT/US2022/048273—ISA/EPO—Feb. 24, 2023.

* cited by examiner

Primary Examiner — Alpus Hsu
Assistant Examiner — Hooman Houshmand
(74) Attorney, Agent, or Firm — Procopio, Cory, Hargreaves & Savitch LLP/Qualcomm

(57) ABSTRACT

Aspect 19 is the apparatus of any of aspects 14-18, further includes that the value of the response time and a value of the first time slot are based on an actual slot of the transmission of the first SL-PRS.

19 Claims, 20 Drawing Sheets

DYNAMIC SWITCH BETWEEN SS-TWR AND DS-TWR FOR SIDELINK POSITIONING

TECHNICAL FIELD

The present disclosure relates generally to communication systems, and more particularly, to a configuration for switching between single sided (SS) two way ranging (TWR) (SS-TWR) and double sided (DS) TWR (DS-TWR).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first UE. The device may be a processor and/or a modem at a first UE or the first UE itself. The apparatus reserves resources for transmission of a first sidelink positioning reference signal (SL-PRS) in a first time slot. The apparatus transmits, to a second UE, the first SL-PRS within the first time slot. The apparatus receives, from the second UE, a second SL-PRS at a second time based on the first time slot and a response time associated with transmission of the second SL-PRS in response to the first SL-PRS. The apparatus measures a time difference between the transmission of the first SL-PRS and reception of the second SL-PRS to determine if a third SL-PRS is to be transmitted to the second UE.

In an aspect of the disclosure, a method, a computer-readable medium, and an apparatus are provided. The apparatus may be a device at a second UE. The device may be a processor and/or a modem at a second UE or the second UE itself. The apparatus receives, from a first UE, a first sidelink positioning reference signal (SL-PRS) transmitted in a first time slot. The apparatus reserves resources for transmission of a second SL-PRS at a second time in response to reception of the first SL-PRS. The apparatus transmits, to the first UE, the second SL-PRS within the second time based on the first time slot and a response time associated with transmission of the second SL-PRS. The apparatus measures a time difference between reception of the first SL-PRS and the transmission of the second SL-PRS to determine if a third SL-PRS is to be transmitted by the first UE.

In an aspect of the disclosure, a method, a computer-readable medium, and an apparatus are provided. The apparatus may be a device at a first UE. The device may be a processor and/or a modem at a first UE or the first UE itself. The apparatus reserves resources for transmission of a first sidelink positioning reference signal (SL-PRS) at least one or more slots in advance. The apparatus transmits, to a second UE, a reservation indication indicating the resources reserved for transmission of the first SL-PRS. The apparatus monitors for a feedback signal from the second UE indicating a confirmation of available resources for reception of the first SL-PRS, wherein the transmission of the first SL-PRS is based at least on the feedback signal.

In an aspect of the disclosure, a method, a computer-readable medium, and an apparatus are provided. The apparatus may be a device at a second UE. The device may be a processor and/or a modem at a second UE or the second UE itself. The apparatus receives, from a first UE, a reservation indication indicating resources reserved for transmission of a first sidelink positioning reference signal (SL-PRS) at least one or more slots in advance. The apparatus determines if an SL-PRS occasion is within k slots of the resources reserved for the transmission of the first SL-PRS. The apparatus transmits a feedback signal to the first UE indicating an availability of the SL-PRS occasion for reception of the first SL-PRS, wherein the transmission of the first SL-PRS is based at least on the feedback signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
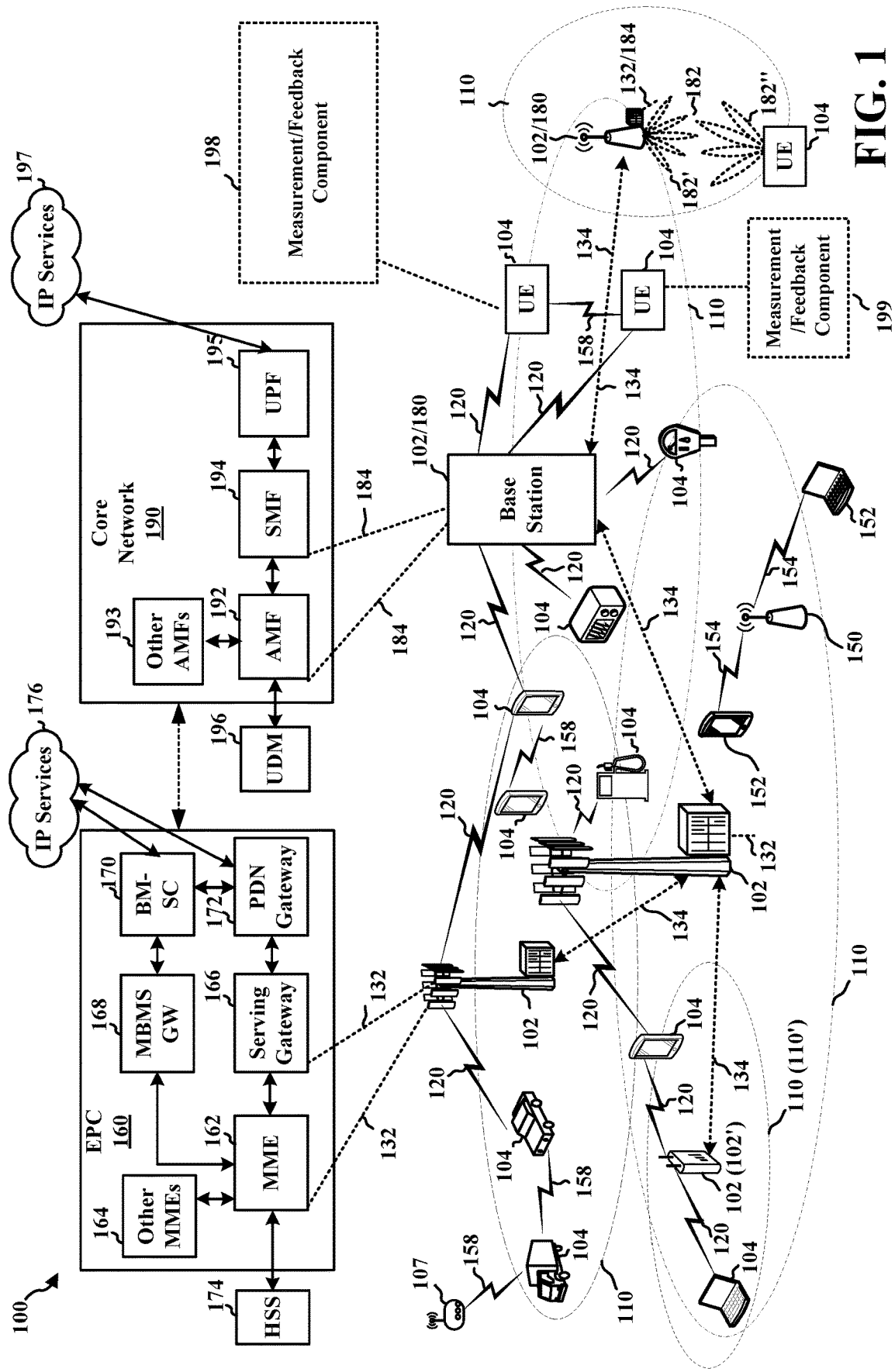
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a first UE 104, or other device communicating based on sidelink, may include a measurement/feedback component 198 configured to dynamically switch from a SS-TWR procedure to a DS-TWR procedure based on a measured time difference between transmission of a first SL-PRS and reception of a second SL-PRS. The measurement/feedback component 198 may be configured to initiate an SS-TWR procedure based on a feedback signal from a second UE indicating availability of resources at the second UE to receive an initial signal of the SS-TWR procedure.

Referring again to FIG. 1, in certain aspects, a second UE 104, or other device communicating based on sidelink, may include a measurement/feedback component 199 configured to measure a time difference between a first and a second SL-PRS of a SS-TWR procedure, to determine if the SS-TWR procedure will switch to a DS-TWR procedure. The measurement/feedback component 199 may be configured to provide feedback to the first UE indicating an availability of an SL-PRS occasion for reception of a first SL-PRS.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
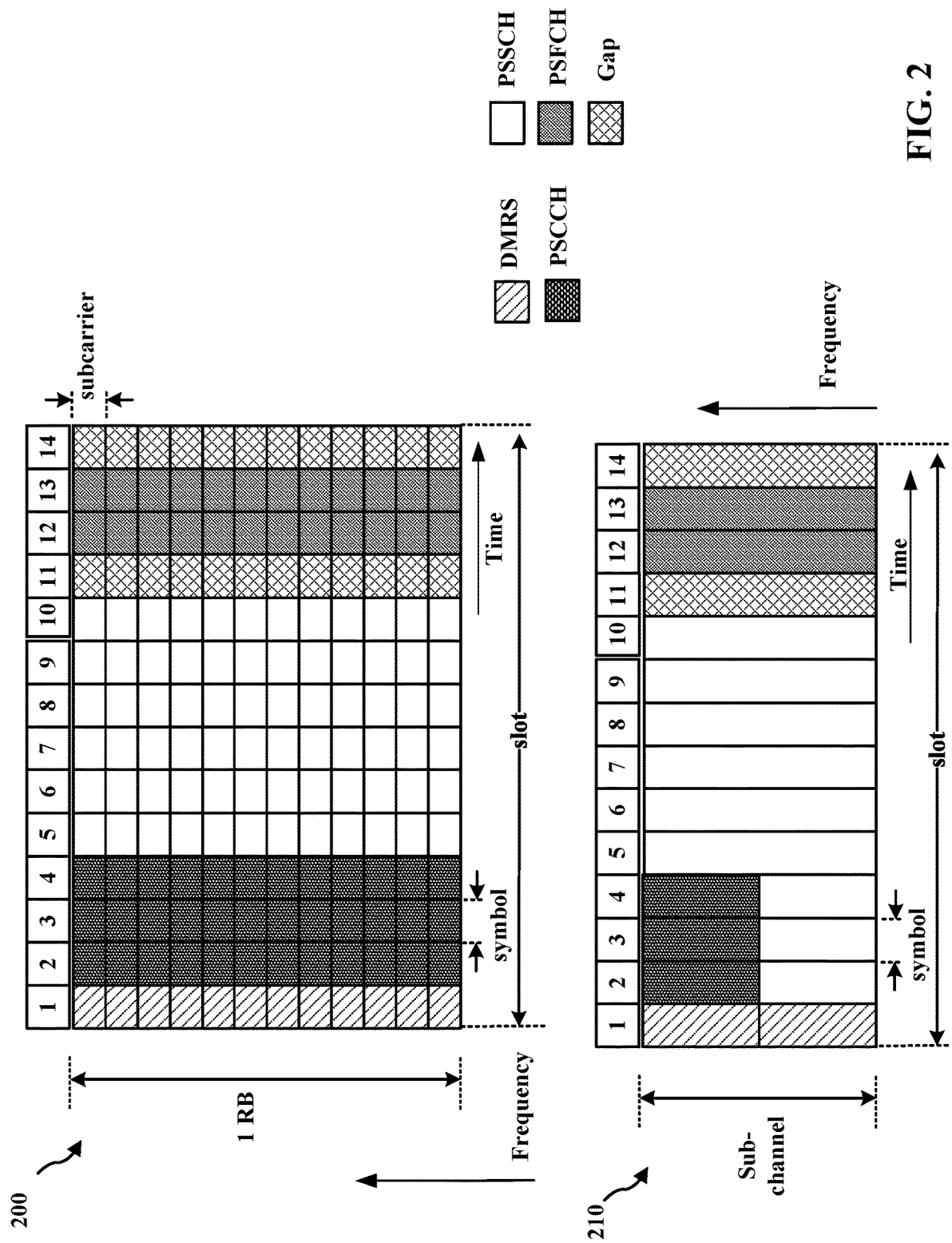
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
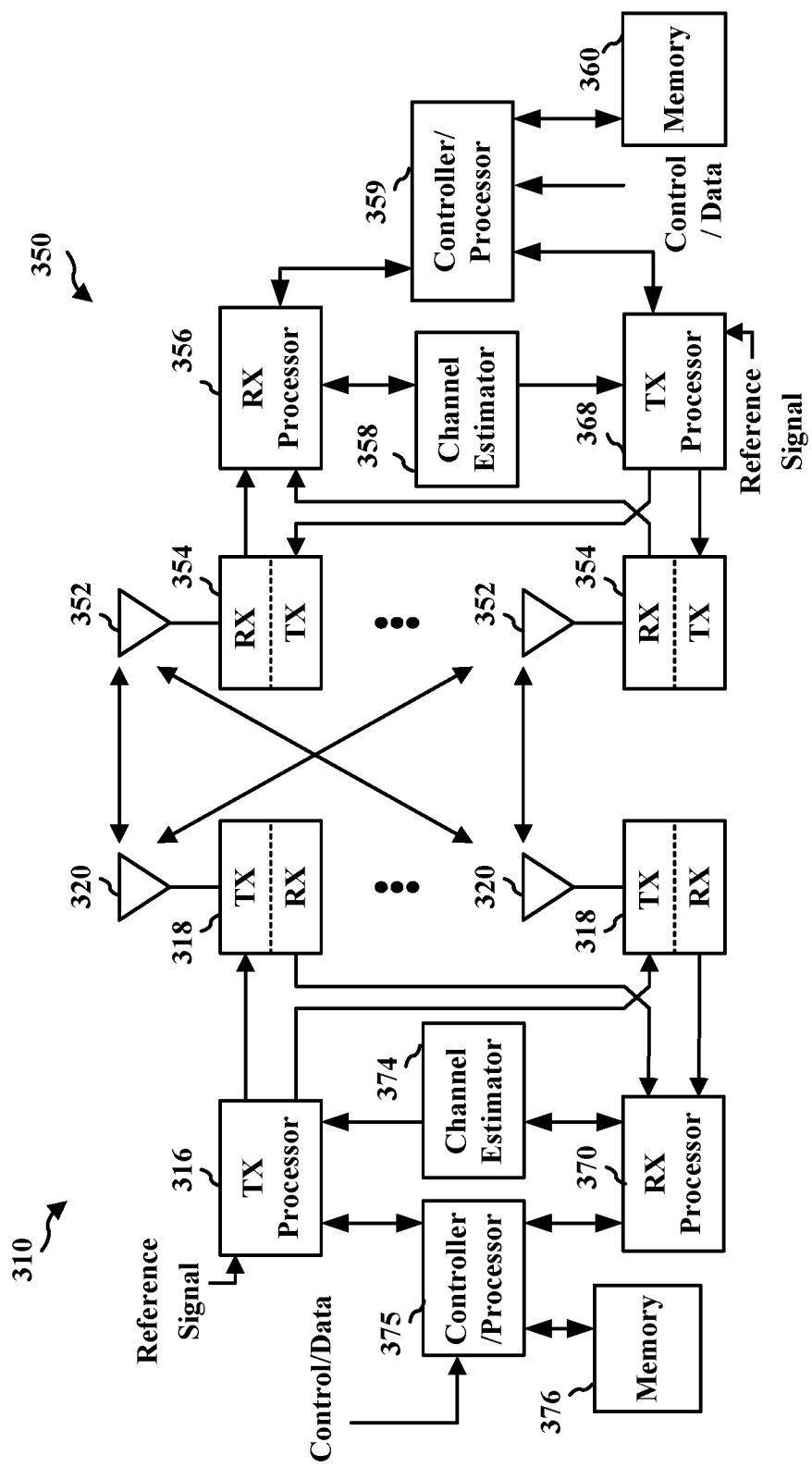
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
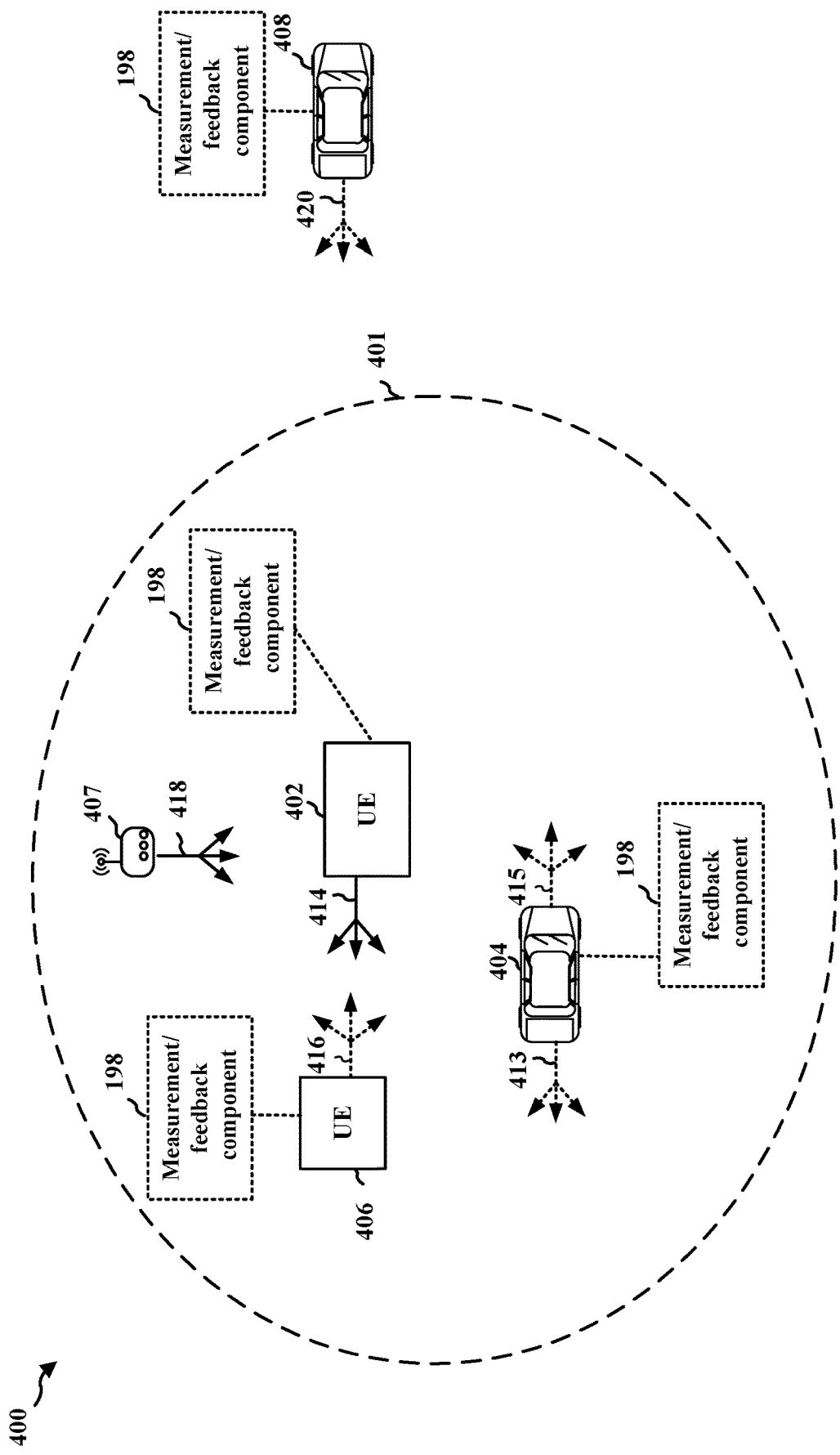
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit communication 413, 415 intended for receipt by other UEs within a range 401 of UE 404, and UE 406 may transmit communication 416. Additionally/alternatively, RSU 407 may receive communication from and/or transmit communication 418 to UEs 402, 404, 406, 408. One or more of the UEs 402, 404, 406, 408 or the RSU 407 may comprise a measurement/feedback component 198 or 199 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
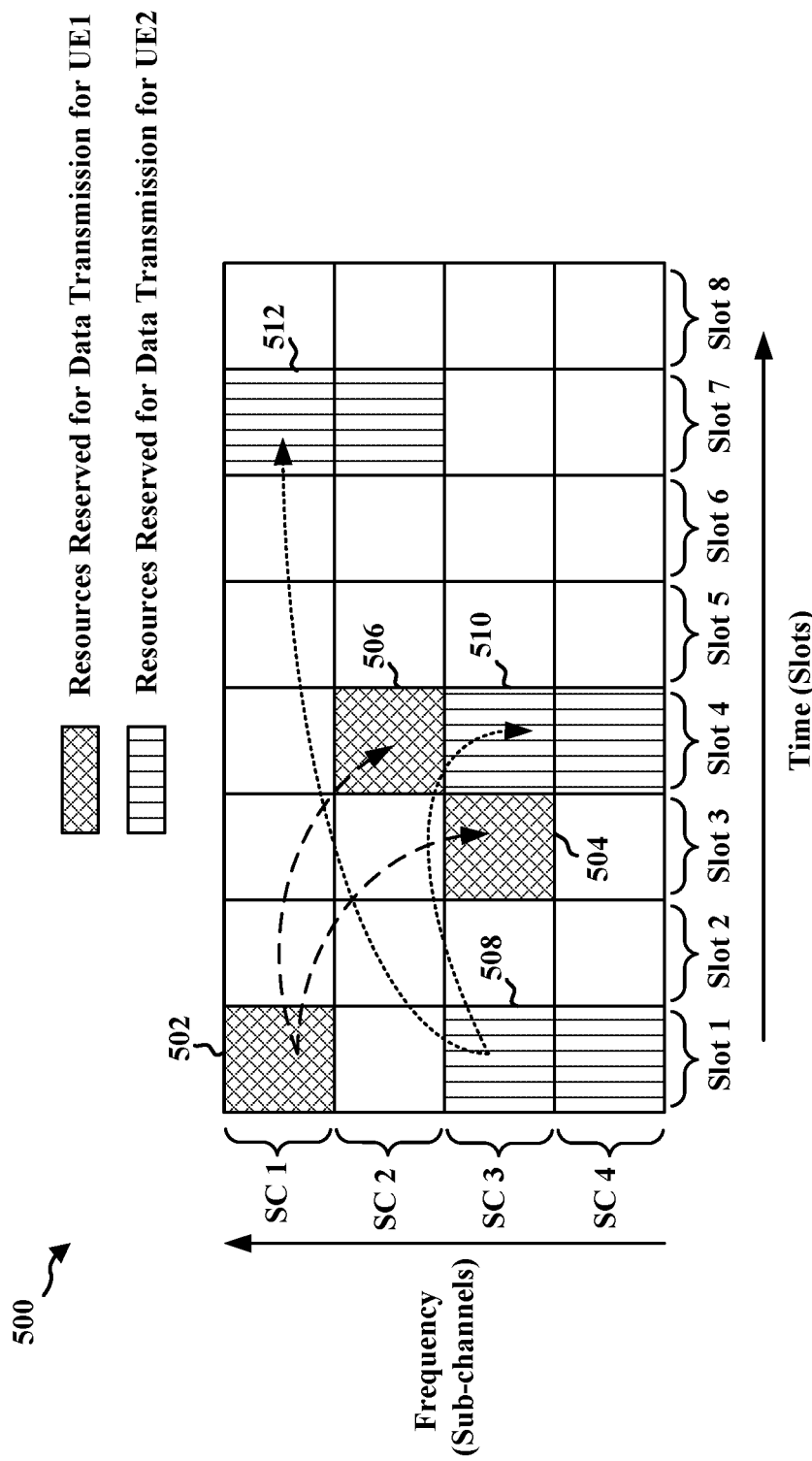
FIG. 5 illustrates examples of resource reservation for sidelink communication.

FIG. 5 is an example 500 of time and frequency resources showing reservations for sidelink transmissions. The resources may be comprised in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 5 illustrates that a second UE ("UE2") reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmissions 508, 510, and 512.

In sidelink communications, sidelink positioning methods may be based on round-trip time (RTT) between a first wireless device and a second wireless device. Sidelink positioning methods may be based on RTT due in part to the difficulty and the overhead involved in the synchronization of the clocks across the wireless devices. SS and DS ranging methods (e.g., SS-TWR and DS-TWR) may both be supported in sidelink communications. In SS-TWR a transmitting device, such as first device 602 of diagram 600 of FIG. 6, may use its clock to measure the RTT and compute a propagation time between the first device 602 and a second device 604. The first device 602 may utilize the computed propagation time to determine a clock drift, or instances where the clocks of the first device 602 and the second device 604 are not synchronized. DS-TWR procedure may utilize an ACK packet from the second device 604 after SS-TWR to compute an additional measurement. DS-TWR may include the transmission to two SL-PRS from the initiating device (e.g., first device 602) and one SL-PRS from the target device (e.g., second device 604). The SS-TWR or the DS-TWR procedures may allow for clock drift corrections between the first device 602 and/or the second device 604.

Figure 6:
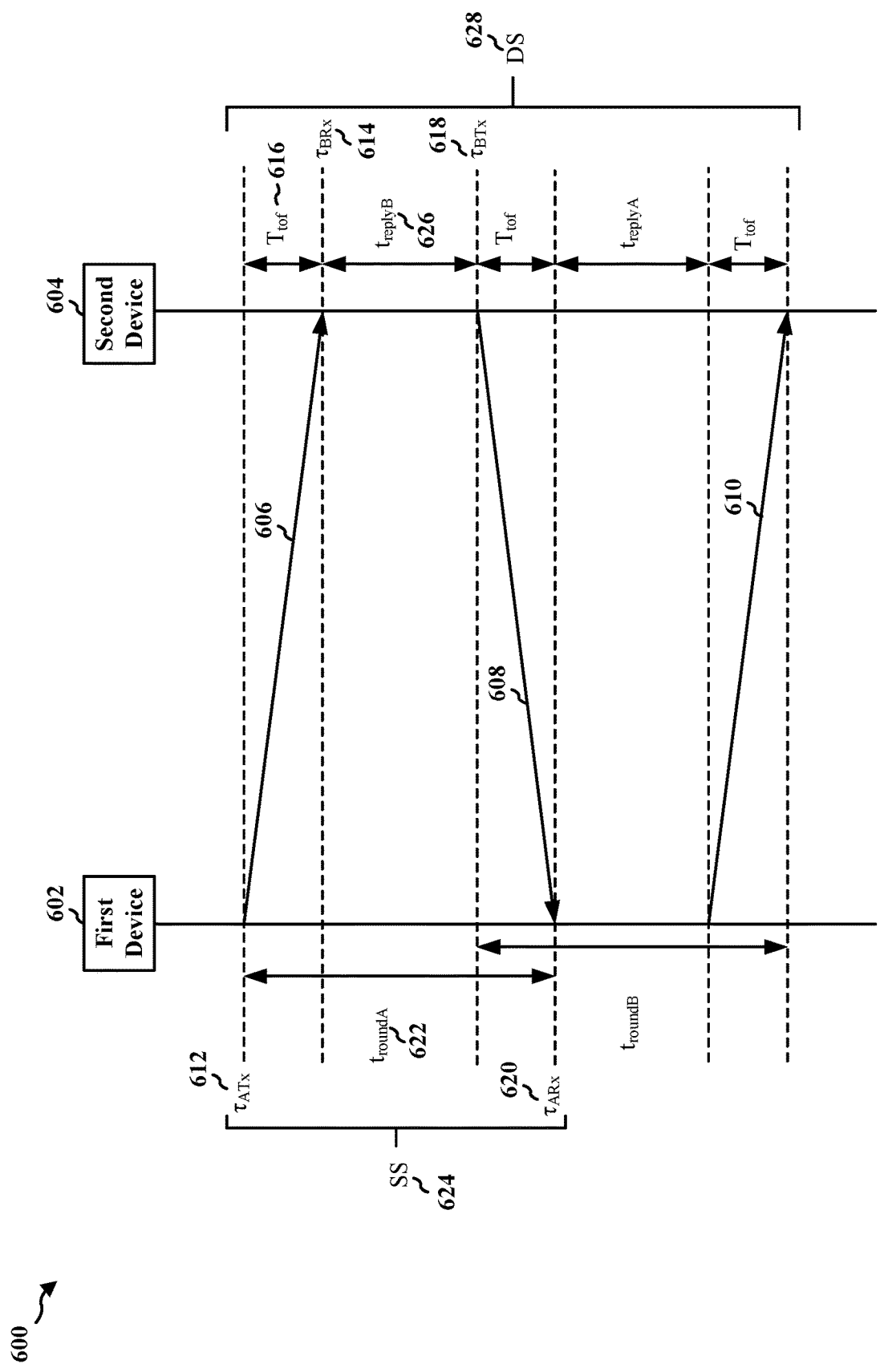
FIG. 6 illustrates an example of a SS-TWR and a DS-TWR procedure.

For example, with reference to diagram 600 of FIG. 6, the first device 602 may transmit a first SL-PRS 606 to the second device 604. The first SL-PRS 606 may include a transmission time 612 and the second device 604 may determine a propagation time 616 based on the difference between the reception time 614 of the first SL-PRS 606 and the transmission time 612 of the first SL-PRS. The second device 604 may transmit a second SL-PRS 608 at a transmission time 618, and the first device 602 may determine the transmission time 622 (e.g., RTT) between the first SL-PRS 606 and the second SL-PRS 608 based on the difference of the reception time 620 at the first device 602 and the transmission time 618. The portion of the process may comprise the SS-TWR 624. To perform DS-TWR 628, the first device 602, after receipt of the second SL-PRS 608, may transmit a third SL-PRS 610. The third SL-PRS may assist in correct clock drift in instances where the clocks of the first device 602 and the second device 604 are not synchronized. The clocks may not be synchronized in instances where the second device 604 takes too much time in between the reception of the first SL-PRS 606 and the transmission of the second SL-PRS 608. If the reply time 626 exceeds a threshold, then it may be determined that clock drift is present.

In some instances, the transmission of the SL-PRS may be scheduled by each device (e.g., first device 602 or second device 604) independently. As such, the first device 602 may reserve resources to transmit the first SL-PRS 606, while the second device 604 may reserve resources to transmit the second SL-PRS 608. For DS-TWR, the first device 602 may reserve resources to transmit the third SL-PRS 610. In some instances, transmission of one or more of the first SL-PRS 606, the second SL-PRS 608, or the third SL-PRS 610 may be dropped due to collisions. There may be a significant time gap between each of the SL-PRSs (e.g., reply time 626), such that the large delays increase the likelihood of clock drift which may reduce positioning accuracy.

Aspects presented herein provide a configuration for dynamically switching between SS-TWR and DS-TWR in instances where a time gap between each of the SL-PRSs exceeds a threshold. For example, a first wireless device may measure a time difference between the transmission of a first SL-PRS and the reception of a second SL-PRS to determine if a third SL-PRS should be transmitted. At least one advantage of the disclosure is that the determination of whether the third SL-PRS should be transmitted may allow the first wireless device to switch from an SS-TWR to a DS-TWR procedure. For example, the first wireless device, upon the determination that the third SL-PRS should be transmitted, may reserve resources for the transmission of the third SL-PRS, such that the third SL-PRS may assist in correcting clock drift between the first wireless device and the second wireless device.

In some instances, the time of transmission of the SL-PRSs may not be predetermined or pre-negotiated between the first and second wireless devices. In such instances, the first wireless device (e.g., the transmitting or initiating device) may reserve the medium for transmission of the first SL-PRS in a first time slot (e.g., time slot n). The second wireless device, after receiving the first SL-PRS from the first wireless device, may reserve the medium for transmitting the second SL-PRS at a second time. The first wireless device may receive the second SL-PRS at the second time. The second time may be based on the first time slot (e.g., time slot n) and a response time (e.g., k) associated with transmission of the second SL-PRS. However, if the value of the response time (e.g., k) is large, then positioning may not be accurate due in part to clock drift. For example, if the value of the response time (e.g., k) exceeds a threshold, the first wireless device may switch the positioning to a DS-TWR procedure automatically. If the value of the response time (e.g., k) does not exceed the threshold, then the first wireless device may determine that positioning accuracy is valid and maintains the SS-TWR procedure. The first wireless device may reserve the medium to transmit the third SL-PRS in instances where positioning may not be accurate. SL-PRS may be pre-empted by higher priority events, even after reservation of the medium, such that the value of the first time slot (e.g., time slot n) and the response time (e.g., k) may be determined by the actual slot in which the SL-PRS transmission occurs. This may enable the first and second wireless devices to estimate the clock drift and apply corrections.

In some instances, the use of RTT measurements for positioning may be from multiple nodes, such that there may be some degree of robustness due to clock errors. Sidelink ranging may only occur between two wireless devices, such that the robustness from multiple measurements may not be feasible. As such, the dynamic switching mechanism may be a utilized for accurate sidelink ranging, while the dynamic switching mechanism may be optionally enabled for positioning. In such instances, the second wireless device may provide feedback to the first wireless device prior to the first wireless device transmitting the first SL-PRS.

For example, the first wireless device may reserve resources for the transmission of the first SL-PRS at least one or more slots (e.g., p slots) in advance of the transmission, and may report the reserved resources for the transmission of the first SL-PRS to the second wireless device. The second wireless device may search for an SL-PRS occasion within one or more slots (e.g., k slots) of the scheduled transmission of the first SL-PRS from the first wireless device. If the second wireless device does not find an SL-PRS occasion within the one or more slots (e.g., k slots) of the scheduled transmission of the first SL-PRS from the first wireless device, then the second wireless device may transmit a feedback message to the first wireless device indicating the lack of available resources at the second wireless device to receive the first SL-PRS. The feedback message may further instruct the first wireless device to not use the reserved resources and to find other resources to transmit the first SL-PRS. The feedback message may be provided via physical sidelink feedback channel (PSFCH), physical sidelink shared channel (PSSCH), or physical sidelink control channel (PSCCH).

The first wireless device may transmit the first SL-PRS upon receipt of a feedback message indicating or confirming available resources at the second wireless device to receive the first SL-PRS. In some instances, the first wireless device may not receive the feedback message or the feedback message indicates that resources are not available at the second wireless device to receive the first SL-PRS, such that the first SL-PRS is not transmitted by the first wireless device.

In some instances, if the first wireless device needs to switch to DS-TWR or the feedback message indicates a lack of resources to receive the SL-PRS, then the first wireless device may consider that the specific resource pool utilized for the transmission of the SL-PRS is busy and may attempt to acquire another resource pool. In some instances, if the response from the second wireless device or the second SL-PRS exceeds a threshold, then the first wireless device may consider that the resource pool is busy and may attempt to acquire another resource pool.

Figure 7:
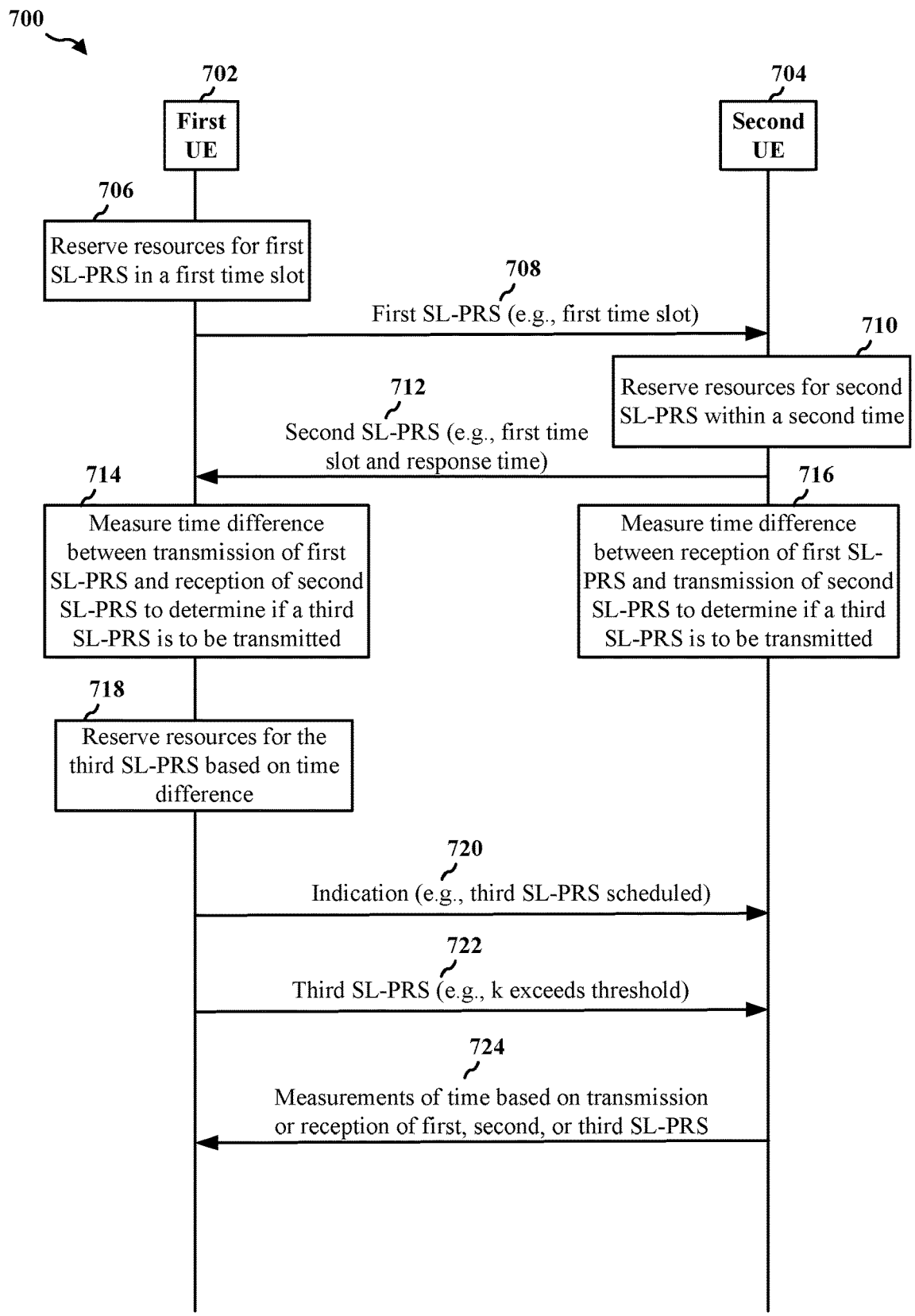
FIG. 7 is an example of a first call flow diagram of signaling between a first UE and a second UE in accordance with certain aspects of the disclosure.

FIG. 7 is a call flow diagram 700 of signaling between a first UE 702 and a second UE 704. The first UE 702 and the second UE 704 may be configured to communicate with a base station. For example, in the context of FIG. 1, the first UE 702 or the second UE 704 may correspond to at least UE 104. In another example, in the context of FIG. 3, the first UE 702 may correspond to the first wireless communication device 310 and the second UE 704 may correspond to the second wireless communication device 350.

At 706, the first UE 702 may reserve resources for transmission of a first SL-PRS. The first UE may reserve resources for the transmission of the first SL-PRS in a first time slot. The first UE 702 may be a transmitting UE, such that the first UE 702 may initiate an SS-TWR procedure.

At 708, the first UE 702 may transmit the first SL-PRS. The first UE may transmit the first SL-PRS to the second UE 704. The second UE 704 may receive the first SL-PRS from the first UE 702. The first UE may transmit the first SL-PRS to the second UE within the first time slot.

At 710, the second UE 704 may reserve resources for transmission of a second SL-PRS. The second UE may reserve the resources for the transmission of the second SL-PRS at a second time in response to the reception of the first SL-PRS.

At 712, the second UE 704 may transmit the second SL-PRS. The second UE 704 may transmit the second SL-PRS to the first UE 702. The first UE 702 may receive the second SL-PRS from the second UE 704. The second UE may transmit the second SL-PRS to the first UE within the second time based on the first time slot and a response time associated with transmission of the second SL-PRS. In some aspects, values for the first time slot or the response time may be configured by a network. In some aspects, the values of the first time slot or the response time may be configured by the network for at least one of the first UE or the second UE or both. The values for the first time slot or the response time may be negotiated between the first UE and the second UE during a connection setup procedure.

At 714, the first UE 702 may measure a time difference between the transmission of the first SL-PRS and the reception of the second SL-PRS. The first UE may measure the time difference between the transmission of the first SL-PRS and the reception of the second SL-PRS to determine if a third SL-PRS should be transmitted to the second UE. In some aspects, the third SL-PRS may not be transmitted if a value of the response time is within a threshold. In some aspects, the transmission or reception of the first or second SL-PRSs may allow for estimation of clock drift between the first UE and the second UE. The clock drift may be corrected based on propagation time of the first or second SL-PRSs between the first UE and the second UE.

At 716, the second UE 704 may measure a time difference between the reception of the first SL-PRS and the transmission of the second SL-PRS. The second UE may measure the time difference between the reception of the first SL-PRS and the transmission of the second SL-PRS to determine if a third SL-PRS should be transmitted by the first UE. In some aspects, the third SL-PRS may not be transmitted by the first UE if a value of the response time is within a threshold. In some aspects, the transmission or the reception of the first or second SL-PRSs may allow for estimation of clock drift between the first UE and the second UE. The clock drift may be corrected based on propagation time of the first or second SL-PRSs between the first UE and the second UE. In such instances, the first UE 702 and the second UE 704 may each determine, independently, whether the third SL-PRS is going to be transmitted by the first UE based at least on the time difference between the reception and/or transmission of the first SL-PRS and the second SL-PRS.

At 718, the first UE 702 may reserve resources for transmission of the third SL-PRS. The first UE may reserve the resources for the transmission of the third SL-PRS based on the time difference between the transmission of the first SL-PRS and the reception of the second SL-PRS. In some aspects, if the time difference between the transmission of the first SL-PRS and the reception of the second SL-PRS exceeds a threshold, then the first UE may reserve resources in preparation of transmitting the third SL-PRS. In instances where the third SL-PRS is determined to be transmitted, the transmission of the third SL-PRS results in the SS-TWR procedure dynamically switching to a DS-TWR procedure, such that the first UE 702 may dynamically switch from a SS-TWR procedure to the DS-TWR procedure based at least on the timing difference.

At 720, the first UE 702 may transmit an indication indicating that the third SL-PRS is scheduled for transmission. The first UE may transmit the indication indicating that the third SL-PRS is scheduled for transmission to the second UE 704. The second UE may receive the indication from the first UE 702.

At 722, the first UE 702 may transmit the third SL-PRS. The first UE may transmit the third SL-PRS to the second UE 704. The second UE 704 may receive the third SL-PRS from the first UE 702. The first UE may transmit the third SL-PRS to the second UE if a value of the response time exceeds a threshold. If the value of the response time exceeds the threshold, then the first UE and the second UE may automatically switch positioning to DS-TWR. The value of the response time may be measured in slots, symbols, or time. The value of the response time may be configured by the first UE or may be preconfigured. In some aspects, resources reserved for transmission of the first SL-PRS may be considered as busy based on the time difference between the transmission of the first SL-PRS and the reception of the second SL-PRS exceeding the threshold. In some aspects, the value of the response time and a value of the first time slot may be based on an actual slot of the transmission of the first SL-PRS. In some aspects, the transmission or reception of the first, second, or third SL-PRSs may allow for estimation of clock drift between the first UE and the second UE. The clock drift may be corrected based on propagation time of the first, second, or third SL-PRSs between the first UE and the second UE.

At 724, the second UE 704 may transmit an indication comprising measurements of the time based on the transmission or the reception of the first SL-PRS, the second SL-PRS, or the third SL-PRS. The second UE may transmit the indication comprising the measurements of the time based on the transmission or the reception of the first SL-PRS, the second SL-PRS, or the third SL-PRS to the first UE 702. The first UE 702 may receive the indication comprising the measurements of the time from the second UE 704. The measurements of the time may at least comprise measurements of n or k.

Figure 8:
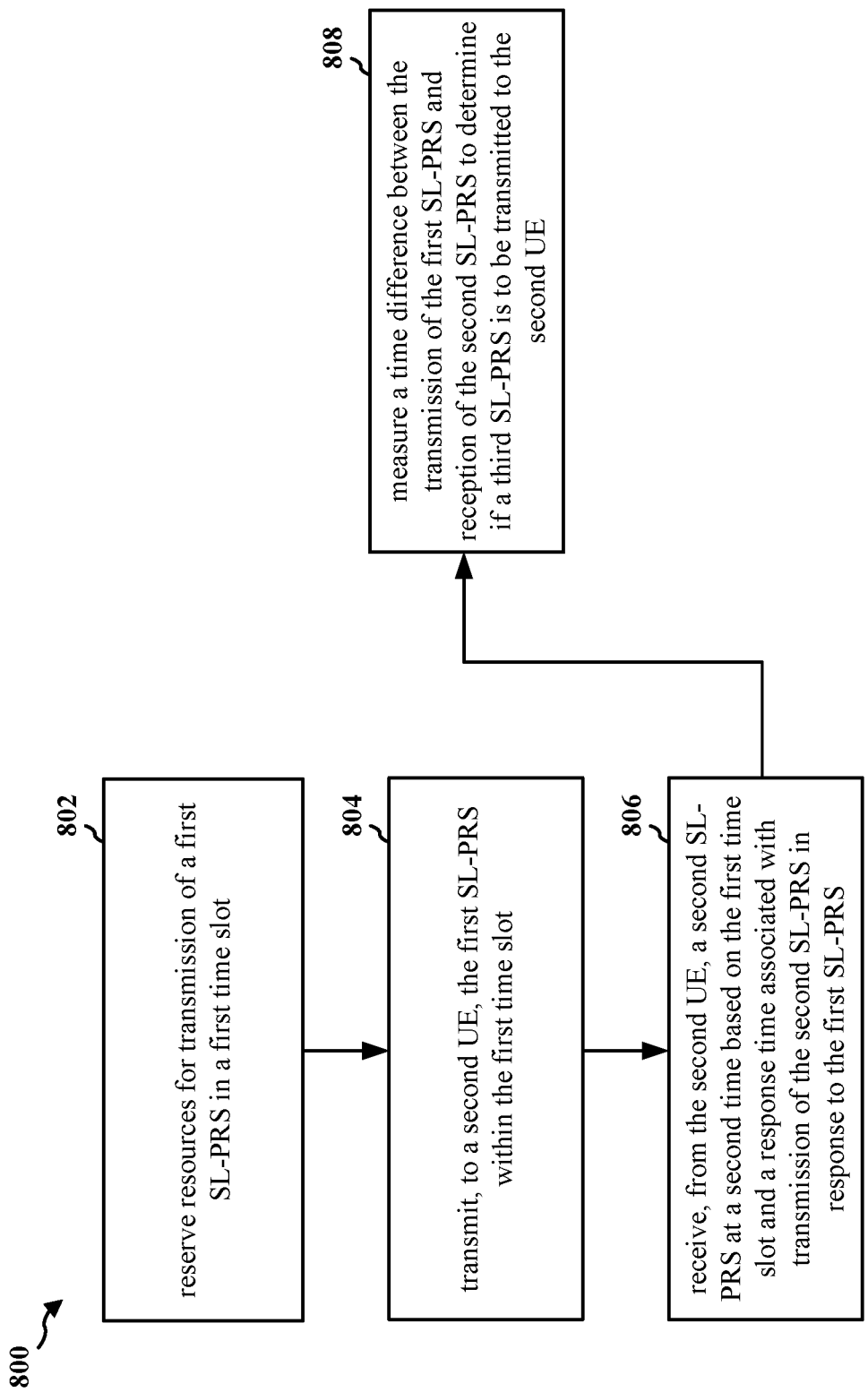
FIG. 8 is a first example of a flowchart of a method of wireless communication of a first UE.

FIG. 8 is a flowchart 800 of a method of wireless communication. The method may be performed by a UE or a component of a UE (e.g., the UE 104; the apparatus 1002). One or more of the illustrated operations may be omitted, transposed, or contemporaneous. The method may allow a first UE to dynamically switch between SS-TWR and DS-TWR.

At 802, the first UE may reserve resources for transmission of a first SL-PRS. For example, 802 may be performed by resources component 1040 of apparatus 1002. The first UE may reserve resources for the transmission of the first SL-PRS in a first time slot.

At 804, the first UE may transmit the first SL-PRS. For example, 804 may be performed by SL-PRS component 1042 of apparatus 1002. The first UE may transmit the first SL-PRS to a second UE. The first UE may transmit the first SL-PRS to the second UE within the first time slot.

At 806, the first UE may receive a second SL-PRS. For example, 806 may be performed by SL-PRS component 1042 of apparatus 1002. The first UE may receive the second SL-PRS from the second UE. The first UE may receive the second SL-PRS from the second UE at a second time based on the first time slot and a response time associated with transmission of the second SL-PRS in response to the first SL-PRS. In some aspects, values for the first time slot or the response time may be configured by a network. In some aspects, the values for the first time slot or the response time may be negotiated between the first UE and the second UE during a connection setup procedure.

At 808, the first UE may measure a time difference between the transmission of the first SL-PRS and the reception of the second SL-PRS. For example, 808 may be performed by SL-PRS component 1042 of apparatus 1002. The first UE may measure the time difference between the transmission of the first SL-PRS and the reception of the second SL-PRS to determine if a third SL-PRS should be transmitted to the second UE. In some aspects, the third SL-PRS may not be transmitted if a value of the response time is within a threshold. In some aspects, the transmission or reception of the first or second SL-PRSs may allow for estimation of clock drift between the first UE and the second UE. The clock drift may be corrected based on propagation time of the first or second SL-PRSs between the first UE and the second UE.

Figure 9:
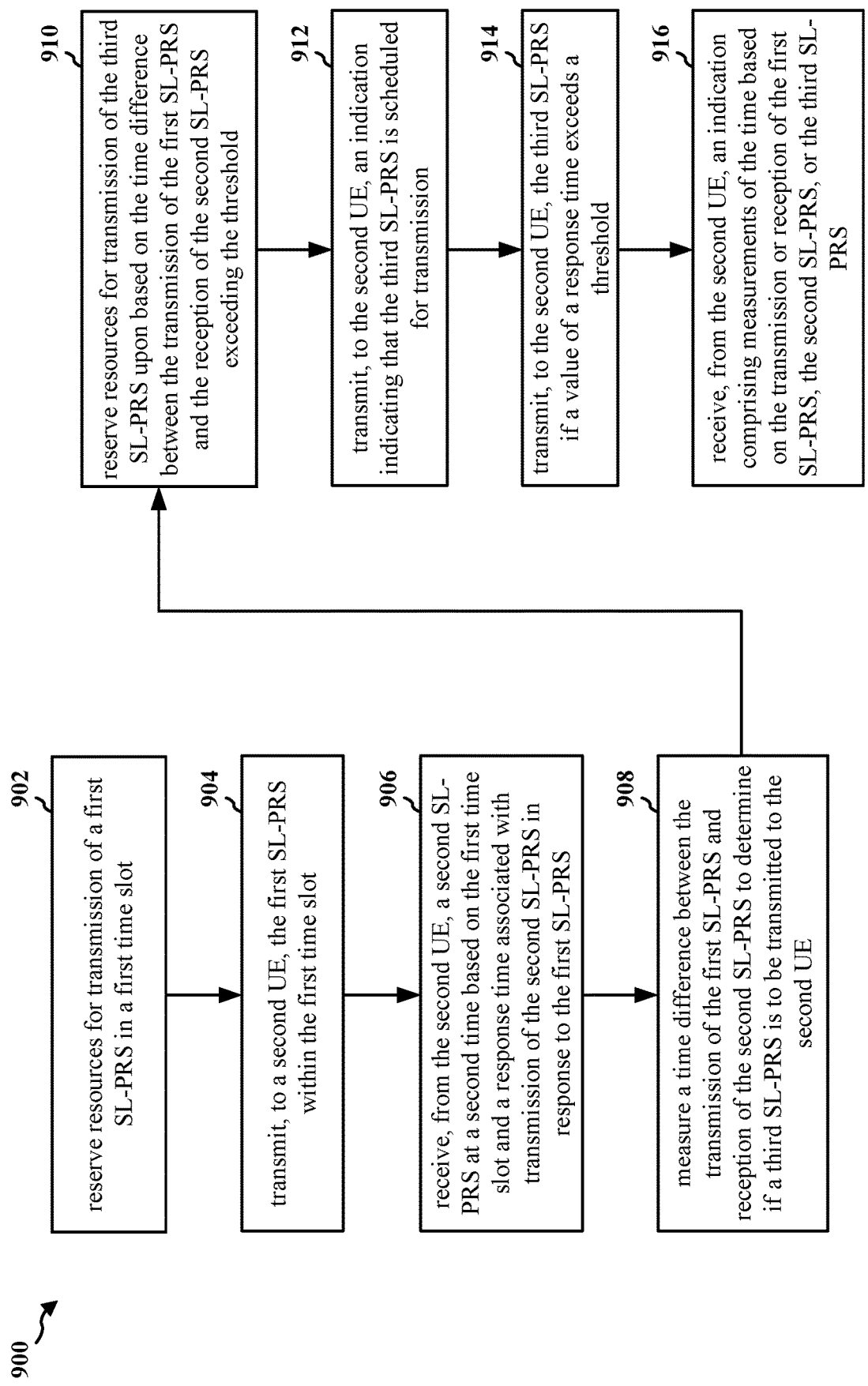
FIG. 9 is a second example of a flowchart of a method of wireless communication of the first UE.

FIG. 9 is a flowchart 900 of a method of wireless communication. The method may be performed by a UE or a component of a UE (e.g., the UE 104; the apparatus 1002). One or more of the illustrated operations may be omitted, transposed, or contemporaneous. The method may allow a first UE to dynamically switch between SS-TWR and DS-TWR.

At 902, the first UE may reserve resources for transmission of a first SL-PRS. For example, 902 may be performed by resources component 1040 of apparatus 1002. The first UE may reserve resources for the transmission of the first SL-PRS in a first time slot.

At 904, the first UE may transmit the first SL-PRS. For example, 904 may be performed by SL-PRS component 1042 of apparatus 1002. The first UE may transmit the first SL-PRS to a second UE. The first UE may transmit the first SL-PRS to the second UE within the first time slot.

At 906, the first UE may receive a second SL-PRS. For example, 906 may be performed by SL-PRS component 1042 of apparatus 1002. The first UE may receive the second SL-PRS from the second UE. The first UE may receive the second SL-PRS from the second UE at a second time based on the first time slot and a response time associated with transmission of the second SL-PRS in response to the first SL-PRS. In some aspects, values for the first time slot or the response time may be configured by a network. In some aspects, the values for the first time slot or the response time may be negotiated between the first UE and the second UE during a connection setup procedure.

At 908, the first UE may measure a time difference between the transmission of the first SL-PRS and the reception of the second SL-PRS. For example, 908 may be performed by SL-PRS component 1042 of apparatus 1002. The first UE may measure the time difference between the transmission of the first SL-PRS and the reception of the second SL-PRS to determine if a third SL-PRS should be transmitted to the second UE. In some aspects, the third SL-PRS may not be transmitted if a value of the response time is within a threshold. In some aspects, the transmission or reception of the first or second SL-PRSs may allow for estimation of clock drift between the first UE and the second UE. The clock drift may be corrected based on propagation time of the first or second SL-PRSs between the first UE and the second UE.

At 910, the first UE may reserve resources for transmission of the third SL-PRS. For example, 910 may be performed by resources component 1040 of apparatus 1002. The first UE may reserve the resources for the transmission of the third SL-PRS based on the time difference between the transmission of the first SL-PRS and the reception of the second SL-PRS. In some aspects, if the time difference between the transmission of the first SL-PRS and the reception of the second SL-PRS exceeds a threshold, then the first UE may reserve resources in preparation of transmitting the third SL-PRS.

At 912, the first UE may transmit an indication indicating that the third SL-PRS is scheduled for transmission. For example, 912 may be performed by SL-PRS component 1042 of apparatus 1002. The first UE may transmit the indication indicating that the third SL-PRS is scheduled for transmission to the second UE.

At 914, the first UE may transmit the third SL-PRS. For example, 914 may be performed by SL-PRS component 1042 of apparatus 1002. The first UE may transmit the third SL-PRS to the second UE. The first UE may transmit the third SL-PRS to the second UE if a value of the response time exceeds a threshold. If the value of the response time exceeds the threshold, then the first UE and the second UE may automatically switch positioning to DS-TWR. The value of the response time may be measured in slots, symbols, or time. The value of the response time may be configured by the first UE or may be preconfigured. In some aspects, resources reserved for transmission of the first SL-PRS may be considered as busy based on the time difference between the transmission of the first SL-PRS and the reception of the second SL-PRS exceeding the threshold. In some aspects, the value of the response time and a value of the first time slot may be based on an actual slot of the transmission of the first SL-PRS. In some aspects, the transmission or reception of the first, second, or third SL-PRSs may allow for estimation of clock drift between the first UE and the second UE. The clock drift may be corrected based on propagation time of the first, second, or third SL-PRSs between the first UE and the second UE.

At 916, the first UE may receive an indication comprising measurements of the time based on the transmission or the reception of the first SL-PRS, the second SL-PRS, or the third SL-PRS. The first UE may receive the indication comprising the measurements of the time based on the transmission or the reception of the first SL-PRS, the second SL-PRS, or the third SL-PRS from the second UE. The measurements of the time may at least comprise measurements of the first time slot or the response time.

Figure 10:
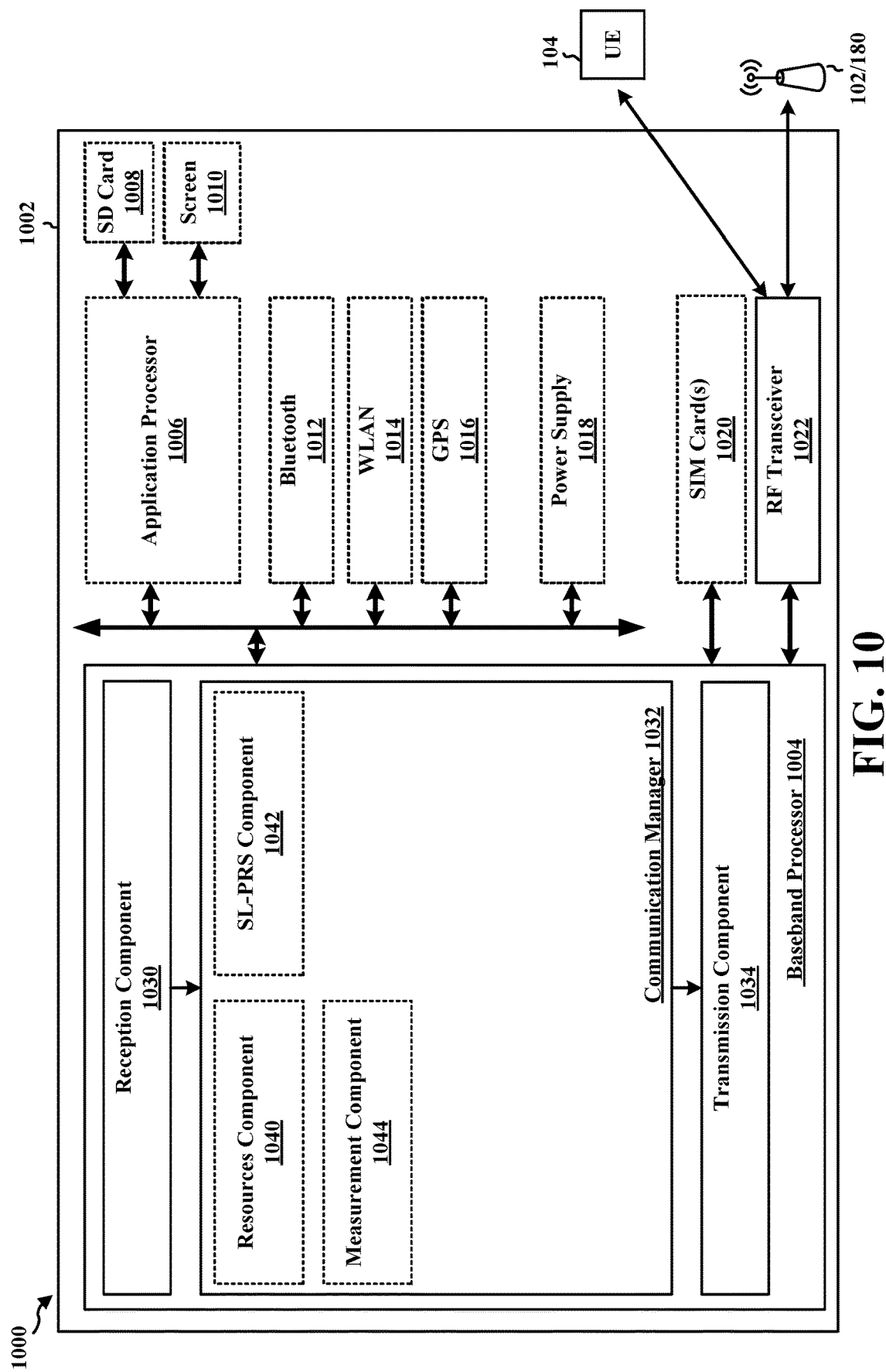
FIG. 10 is a diagram illustrating an example of a hardware implementation for an example apparatus of the first UE of FIG. 8 or FIG. 9.

FIG. 10 is a diagram 1000 illustrating an example of a hardware implementation for an apparatus 1002. The apparatus 1002 may be a UE, or another device configured to transmit and/or receive sidelink communication. The apparatus 1002 includes a baseband processor 1004 (also referred to as a modem) coupled to a RF transceiver 1022. In some aspects, the baseband processor 1004 may be a baseband processor and/or the RF transceiver 1022 may be a cellular RF transceiver. The apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and/or a power supply 1018. In some aspects, the baseband processor 1004 may comprise a cellular baseband processor that communicates through the RF transceiver 1022 with the UE 104 and/or BS 102/180. In some aspects, the baseband processor 1004 may comprise a processor or a non-cellular baseband processor. The baseband processor 1004 may include a computer-readable medium/memory. The computer-readable medium/memory may be non-transitory. The baseband processor 1004 is responsible for general processing, including the execution of software stored on the computer-readable medium/memory. The software, when executed by the baseband processor 1004, causes the baseband processor 1004 to perform the various functions described in the present application. The computer-readable medium/memory may also be used for storing data that is manipulated by the baseband processor 1004 when executing software. The baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband processor 1004. The baseband processor 1004 may be a component of the device 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a resources component 1040 that is configured to reserve resources for transmission of a first SL-PRS, e.g., as described in connection with 802 of FIG. 8 or 902 of FIG. 9. The resources component 1040 may be further configured to reserve resources for transmission of the third SL-PRS, e.g., as described in connection with 910 of FIG. 9. The communication manager 1032 further includes an SL-PRS component 1042 that is configured to transmit the first SL-PRS e.g., as described in connection with 804 of FIG. 8 or 904 of FIG. 9. The SL-PRS component 1042 may be further configured to receive a second SL-PRS, e.g., as described in connection with 806 of FIG. 8 or 906 of FIG. 9. The SL-PRS component 1042 may be further configured to transmit an indication indicating that the third SL-PRS is scheduled for transmission, e.g., as described in connection with 912 of FIG. 9. The SL-PRS component 1042 may be further configured to transmit the third SL-PRS, e.g., as described in connection with 914 of FIG. 9. The communication manager 1032 further includes a measurement component 1044 that is configured to measure a time difference between the transmission of the first SL-PRS and the reception of the second SL-PRS, e.g., as described in connection with 808 of FIG. 8 or 908 of FIG. 9. The measurement component 1044 may be further configured to receive an indication comprising measurements of the time based on the transmission or the reception of the first SL-PRS, the second SL-PRS, or the third SL-PRS, e.g., as described in connection with 916 of FIG. 9.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband processor 1004, includes means for reserving resources for transmission of a first SL-PRS in a first time slot. The apparatus includes means for transmitting, to a second UE, the first SL-PRS within the first time slot. The apparatus includes means for receiving, from the second UE, a second SL-PRS at a second time based on the first time slot and a response time associated with transmission of the second SL-PRS in response to the first SL-PRS. The apparatus includes means for measuring a time difference between the transmission of the first SL-PRS and reception of the second SL-PRS to determine if a third SL-PRS is to be transmitted to the second UE. The apparatus further includes means for transmitting, to the second UE, the third SL-PRS if a value of the response time exceeds a threshold. The apparatus further includes means for reserving resources for transmission of the third SL-PRS based on the time difference between the transmission of the first SL-PRS and the reception of the second SL-PRS exceeding the threshold. The apparatus further includes means for transmitting, to the second UE, an indication indicating that the third SL-PRS is scheduled for transmission. The apparatus further includes means for receiving, from the second UE, an indication comprising measurements of the time based on the transmission or reception of the first SL-PRS, the second SL-PRS, or the third SL-PRS. The measurements of the time at least comprise measurements of the first time slot or the response time. The means may be one or more of the components of the apparatus 1002 configured to perform the functions recited by the means. As described herein, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
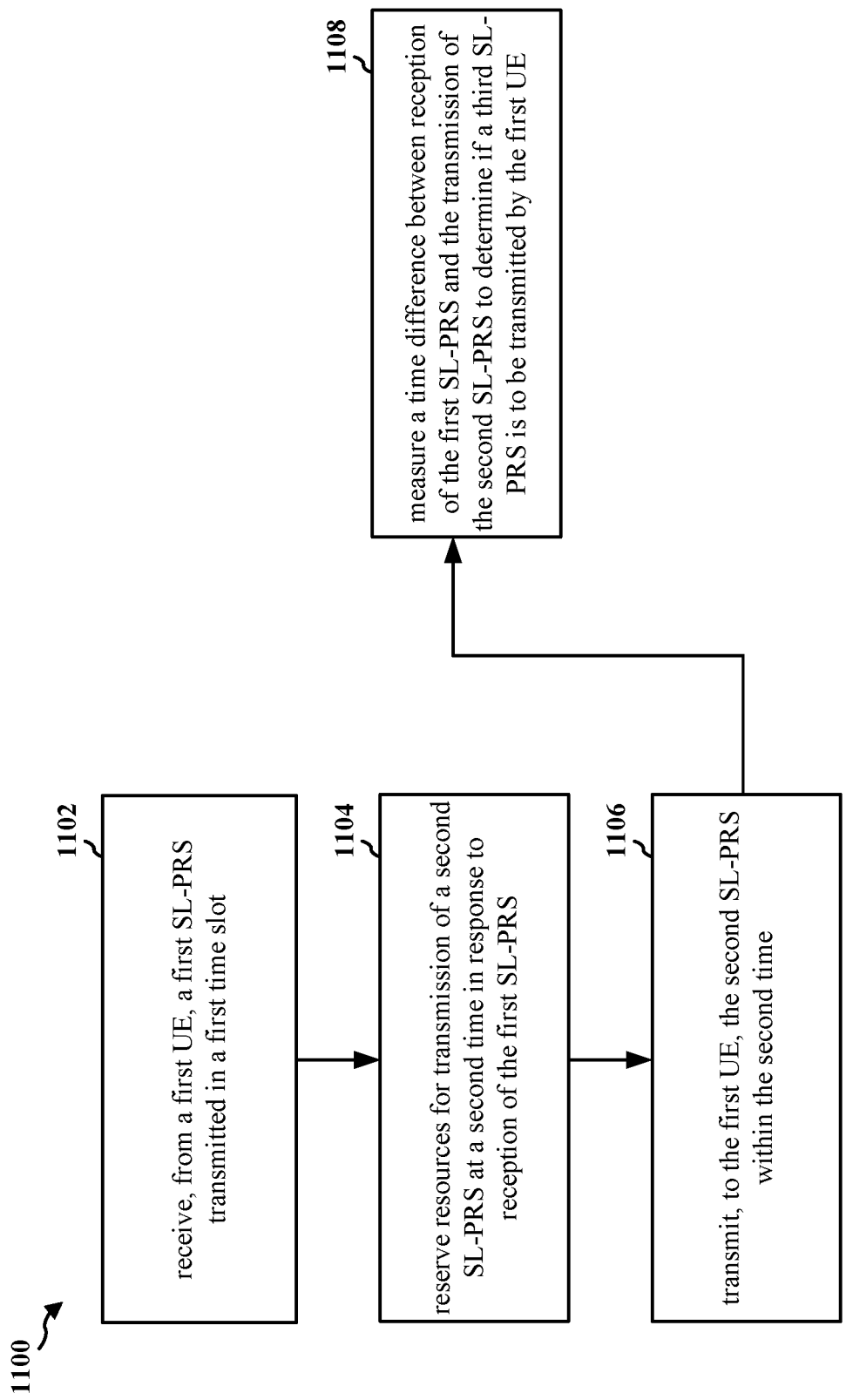
FIG. 11 is a first example of flowchart of a method of wireless communication of a second UE.

FIG. 11 is a flowchart 1100 of a method of wireless communication. The method may be performed by a UE or a component of a UE (e.g., the UE 104; the apparatus 1302). One or more of the illustrated operations may be omitted, transposed, or contemporaneous. The method may allow a second UE to dynamically switch between SS-TWR and DS-TWR.

At 1102, the second UE may receive a first SL-PRS. For example, 1102 may be performed by SL-PRS component 1340 of apparatus 1302. The second UE may receive the first SL-PRS from a first UE. The second UE may receive the first SL-PRS from the first UE transmitted in a first time slot.

At 1104, the second UE may reserve resources for transmission of a second SL-PRS. For example, 1104 may be performed by resources component 1342 of apparatus 1302. The second UE may reserve the resources for the transmission of the second SL-PRS at a second time in response to the reception of the first SL-PRS.

At 1106, the second UE may transmit the second SL-PRS. For example, 1106 may be performed by SL-PRS component 1340 of apparatus 1302. The second UE may transmit the second SL-PRS to the first UE. The second UE may transmit the second SL-PRS to the first UE within the second time based on the first time slot and a response time associated with transmission of the second SL-PRS. In some aspects, values for the first time slot or the response time may be configured by a network. In some aspects, the values of the first time slot or the response time may be configured by the network for at least one of the first UE or the second UE or both. The values for the first slot or the response time may be negotiated between the first UE and the second UE during a connection setup procedure.

At 1108, the second UE may measure a time difference between the reception of the first SL-PRS and the transmission of the second SL-PRS. For example, 1108 may be performed by measurement component 1344 of apparatus 1302. The second UE may measure the time difference between the reception of the first SL-PRS and the transmission of the second SL-PRS to determine if a third SL-PRS should be transmitted by the first UE. In some aspects, the third SL-PRS may not be transmitted by the first UE if a value of the response time is within a threshold. In some aspects, the transmission or the reception of the first or second SL-PRSs may allow for estimation of clock drift between the first UE and the second UE. The clock drift may be corrected based on propagation time of the first or second SL-PRSs between the first UE and the second UE.

Figure 12:
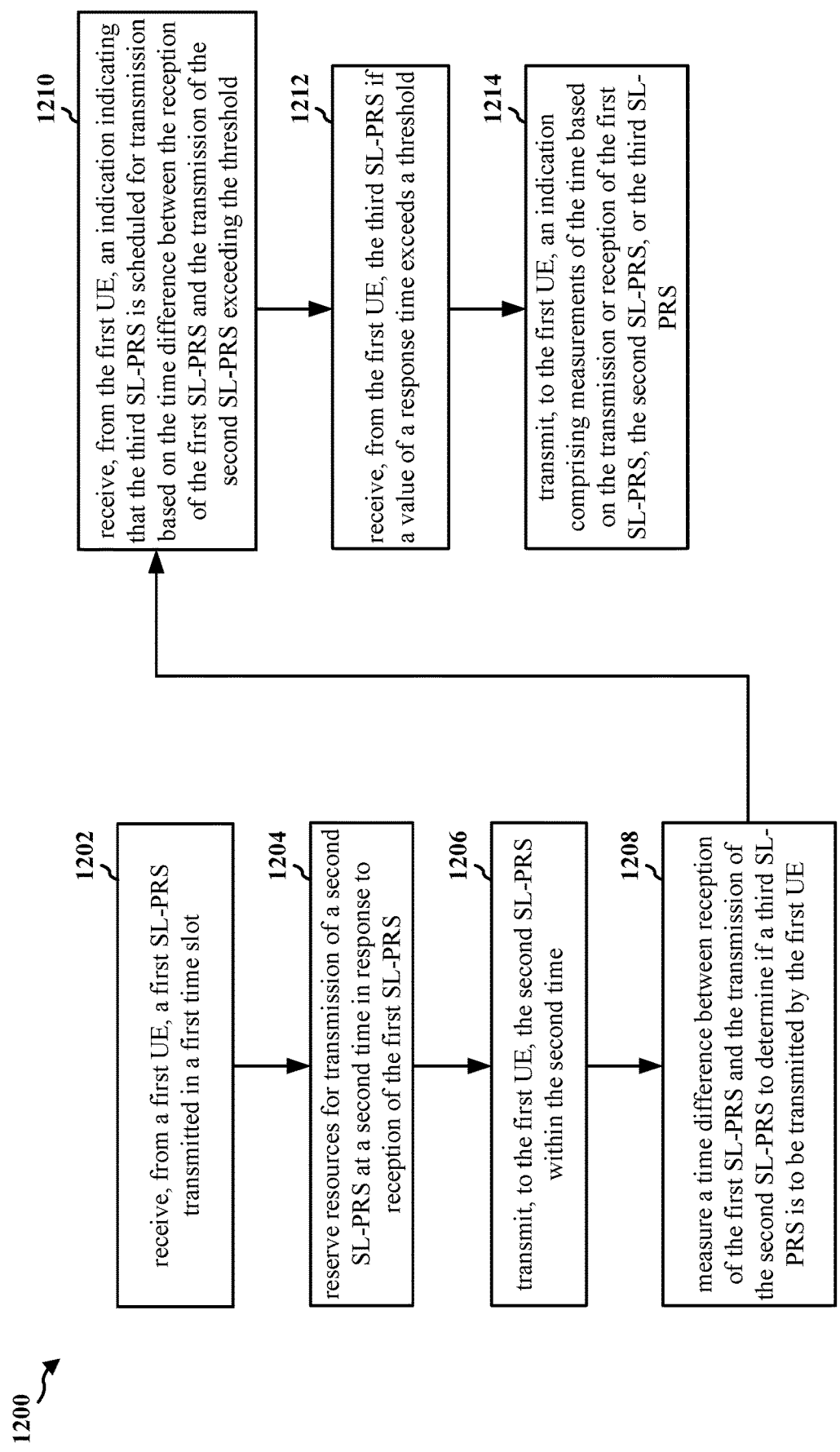
FIG. 12 is a second example of a flowchart of a method of wireless communication of the second UE.

FIG. 12 is a flowchart 1200 of a method of wireless communication. The method may be performed by a UE or a component of a UE (e.g., the UE 104; the apparatus 1302). One or more of the illustrated operations may be omitted, transposed, or contemporaneous. The method may allow a second UE to dynamically switch between SS-TWR and DS-TWR.

At 1202, the second UE may receive a first SL-PRS. For example, 1202 may be performed by SL-PRS component 1340 of apparatus 1302. The second UE may receive the first SL-PRS from a first UE. The second UE may receive the first SL-PRS from the first UE transmitted in a first time slot.

At 1204, the second UE may reserve resources for transmission of a second SL-PRS. For example, 1204 may be performed by resources component 1342 of apparatus 1302. The second UE may reserve the resources for the transmission of the second SL-PRS at a second time in response to the reception of the first SL-PRS.

At 1206, the second UE may transmit the second SL-PRS. For example, 1106 may be performed by SL-PRS component 1340 of apparatus 1302. The second UE may transmit the second SL-PRS to the first UE. The second UE may transmit the second SL-PRS to the first UE within the second time based on the first time slot and a response time associated with transmission of the second SL-PRS. In some aspects, values for the first time slot or the response time may be configured by a network. In some aspects, the values of the first time slot or the response time may be configured by the network for at least one of the first UE or the second UE or both. The values for the first slot or the response time may be negotiated between the first UE and the second UE during a connection setup procedure.

At 1208, the second UE may measure a time difference between the reception of the first SL-PRS and the transmission of the second SL-PRS. For example, 1208 may be performed by measurement component 1344 of apparatus 1302. The second UE may measure the time difference between the reception of the first SL-PRS and the transmission of the second SL-PRS to determine if a third SL-PRS should be transmitted by the first UE. In some aspects, the third SL-PRS may not be transmitted by the first UE if a value of the response time is within a threshold. In some aspects, the transmission or the reception of the first or second SL-PRSs may allow for estimation of clock drift between the first UE and the second UE. The clock drift may be corrected based on propagation time of the first or second SL-PRSs between the first UE and the second UE.

At 1210, the second UE may receive an indication indicating that the third SL-PRS is scheduled for transmission. For example, 1210 may be performed by SL-PRS component 1340 of apparatus 1302. The second UE may receive the indication indicating that the third SL-PRS is scheduled for the transmission from the first UE. The second UE may receive the indication indicating that the third SL-PRS is scheduled for the transmission from the first UE based on the time difference between the reception of the first SL-PRS and the transmission of the second SL-PRS. In some aspects, if the time difference between the reception of the first SL-PRS and the transmission of the second SL-PRS exceeds a threshold, then the first UE may reserve resources in preparation of transmitting the third SL-PRS and transmit the indication indicating that the third SL-PRS is scheduled for transmission.

At 1212, the second UE may receive the third SL-PRS. For example, 1212 may be performed by SL-PRS component 1340 of apparatus 1302. The second UE may receive the third SL-PRS from the first UE. The second UE may receive the third SL-PRS from the first UE if a value of the response time exceeds a threshold. If the value of the response time exceeds the threshold, then the first UE and the second UE may automatically switch positioning to DS-TWR. The value of the response time may be measured in slots, symbols, or time. The value of the response time may be configured by the first UE or may be preconfigured.

In some aspects, the value of the response time and a value of the first slot may be based on an actual slot of the transmission of the first SL-PRS. In some aspects, the transmission or reception of the first, second, or third SL-PRSs may allow for estimation of clock drift between the first UE and the second UE. The clock drift may be corrected based on propagation time of the first, second, or third SL-PRSs between the first UE and the second UE.

At 1214, the second UE may transmit an indication comprising measurements of the time based on the transmission or the reception of the first SL-PRS, the second SL-PRS, or the third SL-PRS. For example, 1214 may be performed by measurement component 1344 of apparatus 1302. The second UE may transmit the indication comprising the measurements of the time based on the transmission or the reception of the first SL-PRS, the second SL-PRS, or the third SL-PRS to the first UE. The measurements of the time may at least comprise measurements of the first slot or the response time.

Figure 13:
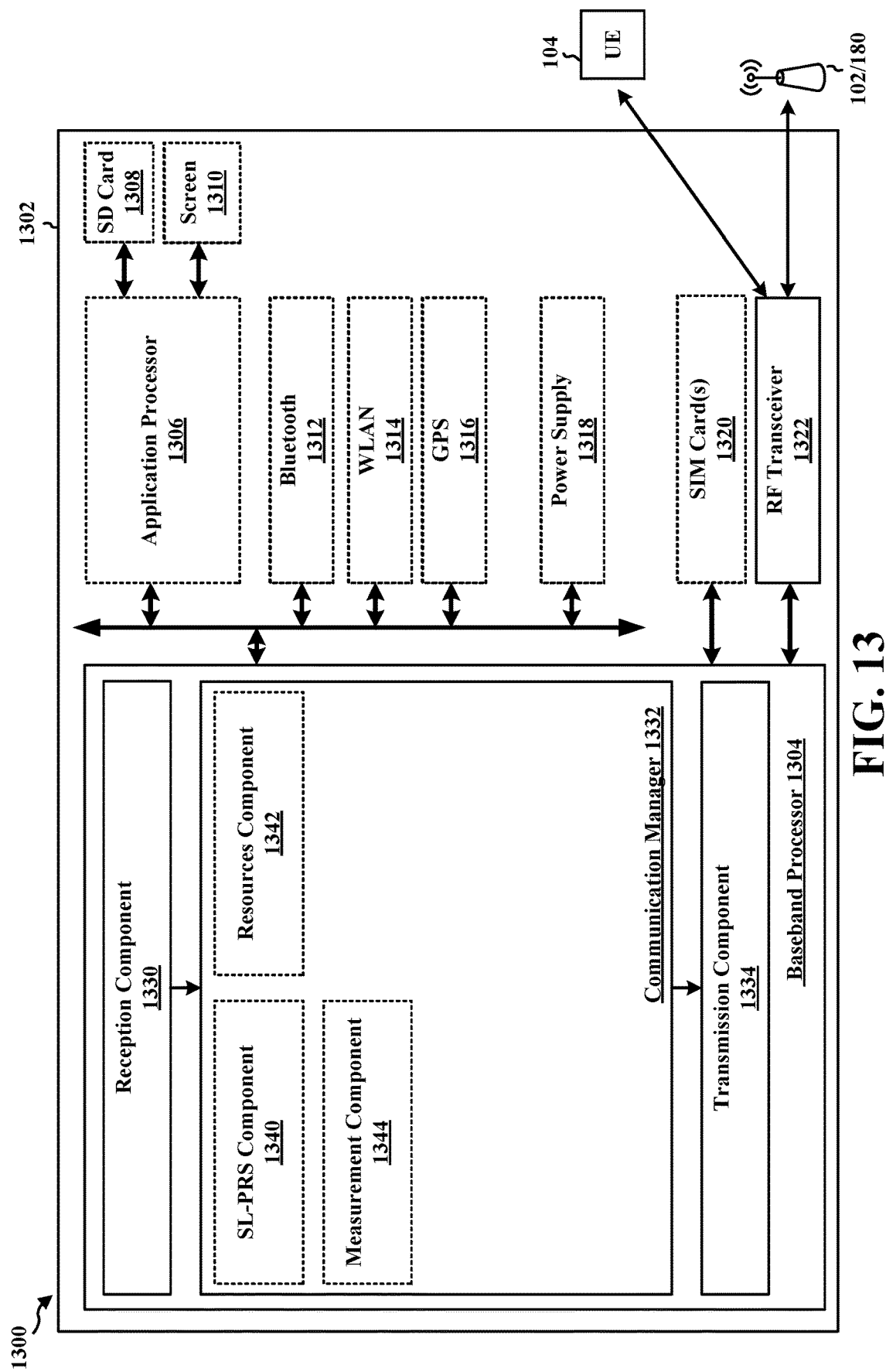
FIG. 13 is a diagram illustrating an example of a hardware implementation for an example apparatus of the second UE of FIG. 11 or FIG. 12.

FIG. 13 is a diagram 1300 illustrating an example of a hardware implementation for an apparatus 1302. The apparatus 1302 may be a UE, or another device configured to transmit and/or receive sidelink communication. The apparatus 1302 includes a baseband processor 1304 (also referred to as a modem) coupled to a RF transceiver 1322. In some aspects, the baseband processor 1304 may be a baseband processor and/or the RF transceiver 1322 may be a cellular RF transceiver. The apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and/or a power supply 1318. In some aspects, the baseband processor 1304 may comprise a cellular baseband processor that communicates through the RF transceiver 1322 with the UE 104 and/or BS 102/180. In some aspects, the baseband processor 1304 may comprise a processor or a non-cellular baseband processor. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described in the present application. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes an SL-PRS component 1340 that is configured to receive a first SL-PRS, e.g., as described in connection with 1102 of FIG. 11 or 1202 of FIG. 12. The SL-PRS component 1340 may be further configured to transmit the second SL-PRS, e.g., as described in connection with 1106 of FIG. 11 or 1206 of FIG. 12. The SL-PRS component 1340 may be further configured to receive an indication indicating that the third SL-PRS is scheduled for transmission, e.g., as described in connection with 1210 of FIG. 12. The SL-PRS component 1340 may be further configured to receive the third SL-PRS, e.g., as described in connection with 1212 of FIG. 12. The communication manager 1332 further includes a resources component 1342 that is configured to reserve resources for transmission of a second SL-PRS, e.g., as described in connection with 1104 of FIG. 11 or 1204 of FIG. 12. The communication manager 1332 further includes a measurement component 1344 that is configured to measure a time difference between the reception of the first SL-PRS and the transmission of the second SL-PRS, e.g., as described in connection with 1108 of FIG. 11 or 1208 of FIG. 12. The measurement component 1344 may be further configured to transmit an indication comprising measurements of the time based on the transmission or the reception of the first SL-PRS, the second SL-PRS, or the third SL-PRS, e.g., as described in connection with 1214 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband processor 1304, includes means for receiving, from a first UE, a first SL-PRS transmitted in a first time slot. The apparatus includes means for reserving resources for transmission of a second SL-PRS at a second time in response to reception of the first SL-PRS. The apparatus includes means for transmitting, to the first UE, the second SL-PRS within the second time based on the first time slot and a response time associated with transmission of the second SL-PRS. The apparatus includes means for measuring a time difference between reception of the first SL-PRS and the transmission of the second SL-PRS to determine if a third SL-PRS is to be transmitted by the first UE. The apparatus further includes means for receiving, from the first UE, the third SL-PRS if a value of the response time exceeds a threshold. The apparatus further includes means for receiving, from the first UE, an indication indicating that the third SL-PRS is scheduled for transmission based on the time difference between the reception of the first SL-PRS and the transmission of the second SL-PRS exceeding the threshold. The apparatus further includes means for transmitting, to the first UE, an indication comprising measurements of the time based on the transmission or reception of the first SL-PRS, the second SL-PRS, or the third SL-PRS. The means may be one or more of the components of the apparatus 1302 configured to perform the functions recited by the means. As described herein, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
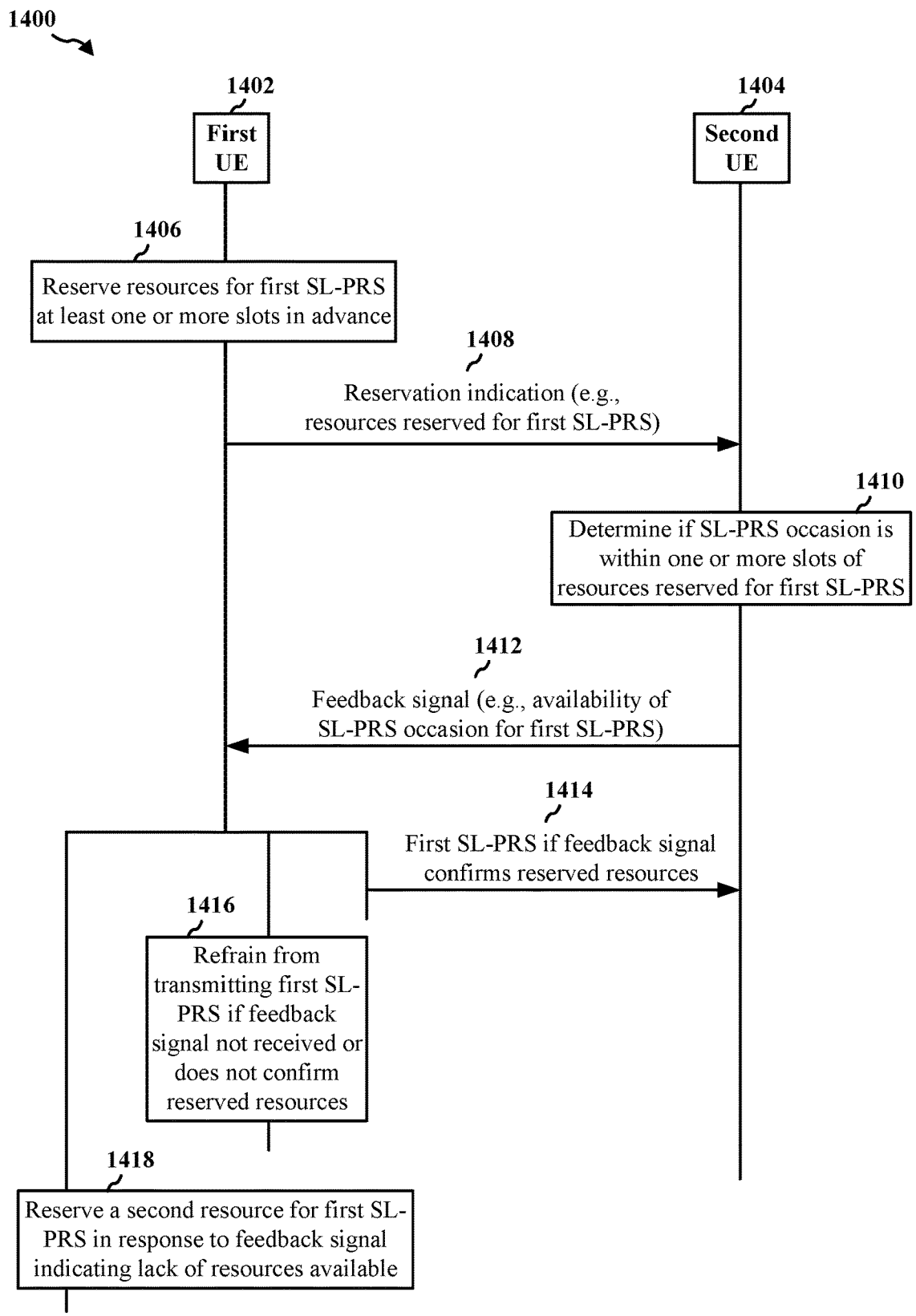
FIG. 14 is an example of a second call flow diagram of signaling between a first UE and a second UE in accordance with certain aspects of the disclosure.

FIG. 14 is a call flow diagram 1400 of signaling between a first UE 1402 and a second UE 1404. The first UE 1402 and the second UE 1404 may be configured to communicate with a base station. For example, in the context of FIG. 1, the first UE 1402 or the second UE 1404 may correspond to at least UE 104. In another example, in the context of FIG. 3, the first UE 1402 may correspond to the first wireless communication device 310 and the second UE 1404 may correspond to the second wireless communication device 350.

At 1406, the first UE 1402 may reserve resources for transmission of a first SL-PRS. The first UE may reserve the resources for the transmission of the first SL-PRS at least one or more slots in advance.

At 1408, the first UE 1402 may transmit a reservation indication indicating the resources reserved for transmission of the first SL-PRS. The first UE may transmit the reservation indication indicating the resources reserved for the transmission of the first SL-PRS to the second UE 1404. The second UE 1404 may receive the reservation from the first UE 1402.

At 1410, the second UE 1404, in response to receipt of the reservation from the first UE 1402, may determine if an SL-PRS occasion is within one or more slots of the resources reserved for the transmission of the first SL-PRS.

At 1412, the second UE 1404 may transmit a feedback signal indicating an availability of the SL-PRS occasion for reception of the first SL-PRS. The second UE may transmit the feedback signal to the first UE 1402. The first UE 1402 may receive the feedback signal from the second UE 1404. The transmission of the first SL-PRS, by the first UE, may be based at least on the feedback signal from the second UE. In some aspects, the feedback signal may be comprised within at least one of a PSFCH, a PSSCH, or a PSCCH. In some aspects, the feedback signal may indicate a lack of the availability of the SL-PRS occasion for the reception of the first SL-PRS.

At 1414, the first UE 1402 may transmit the first SL-PRS. The first UE may transmit the first SL-PRS if the feedback signal received from the second UE confirms the resources reserved for the transmission of the first SL-PRS. The first UE 1402 may transmit the first SL-PRS to the second UE 1404. The second UE 1404 may receive the first SL-PRS from the first UE 1402.

At 1416, the first UE 1402 may refrain from transmitting the first SL-PRS. The first UE may refrain from transmitting the first SL-PRS if the feedback signal is not received or does not confirm the resources reserved for the transmission of the first SL-PRS are available at the second UE.

At 1418, the first UE 1402 may reserve a second resource for the transmission of the first SL-PRS. The first UE may reserve the second resource for the transmission of the first SL-PRS in response to the feedback signal indicating a lack of resources available at the second UE for the reception of the first SL-PRS. In some aspects, the resources reserved for the transmission of the first SL-PRS may be considered as busy in response to the feedback signal indicating the lack of the resources available at the second UE for the reception of the first SL-PRS.

Figure 15:
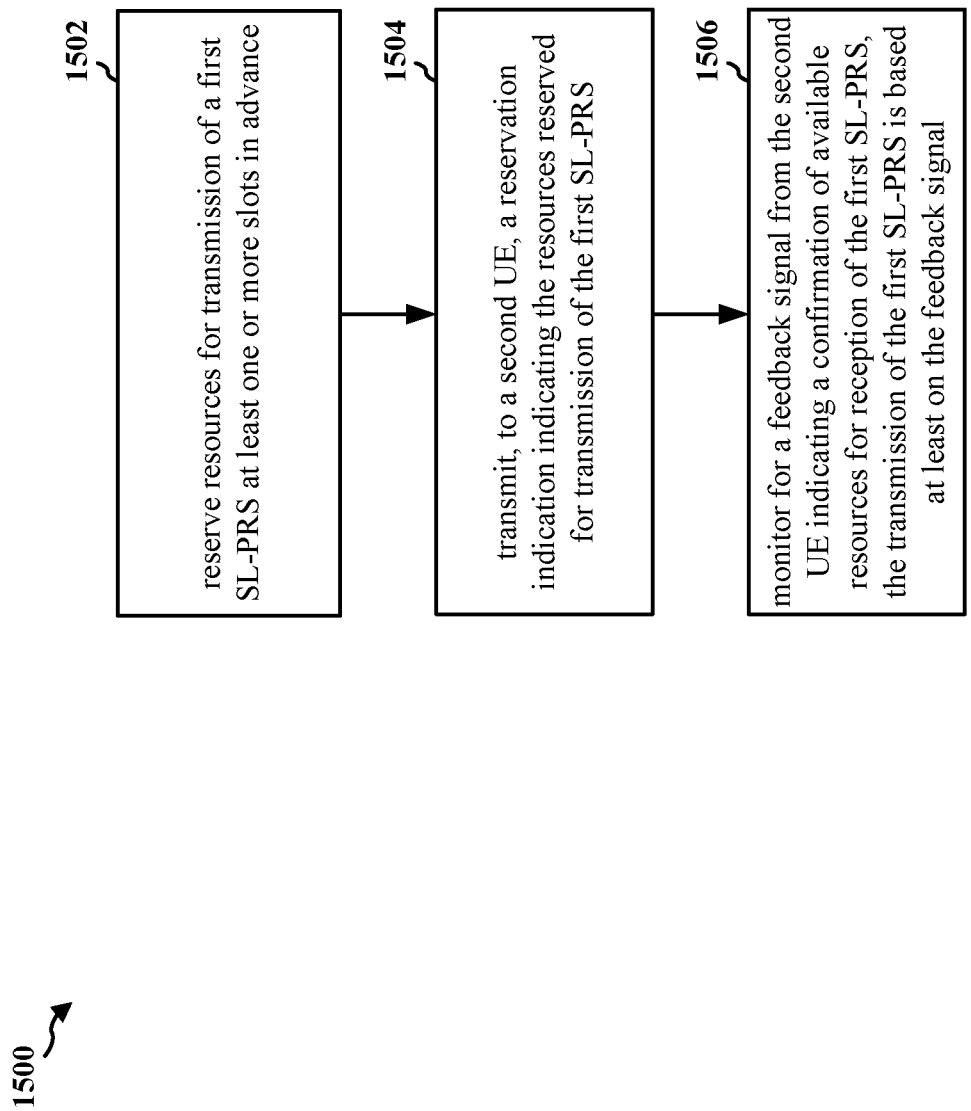
FIG. 15 is a third example of a flowchart of a method of wireless communication of a first UE.

FIG. 15 is a flowchart 1500 of a method of wireless communication. The method may be performed by a UE or a component of a UE (e.g., the UE 104; the apparatus 1702). One or more of the illustrated operations may be omitted, transposed, or contemporaneous. The method may allow a first UE to initiate a sidelink ranging procedure based on feedback from a second UE.

At 1502, the first UE may reserve resources for transmission of a first SL-PRS. For example, 1502 may be performed by resources component 1740 of apparatus 1702. The first UE may reserve the resources for the transmission of the first SL-PRS at least one or more slots in advance.

At 1504, the first UE may transmit a reservation indication indicating the resources reserved for transmission of the first SL-PRS. For example, 1504 may be performed by resources component 1740 of apparatus 1702. The first UE may transmit the reservation indication indicating the resources reserved for the transmission of the first SL-PRS to the second UE.

At 1506, the first UE may monitor for a feedback signal from the second UE. For example, 1506 may be performed by feedback component 1742 of apparatus 1702. The feedback signal from the second UE may indicate a confirmation of available resources for reception of the first SL-PRS at the second UE. The transmission of the first SL-PRS may be based at least on the feedback signal. In some aspects, the feedback signal may be comprised within at least one of a physical sidelink feedback channel (PSFCH), a physical sidelink shared channel (PSSCH), or a physical sidelink control channel (PSCCH).

Figure 16:
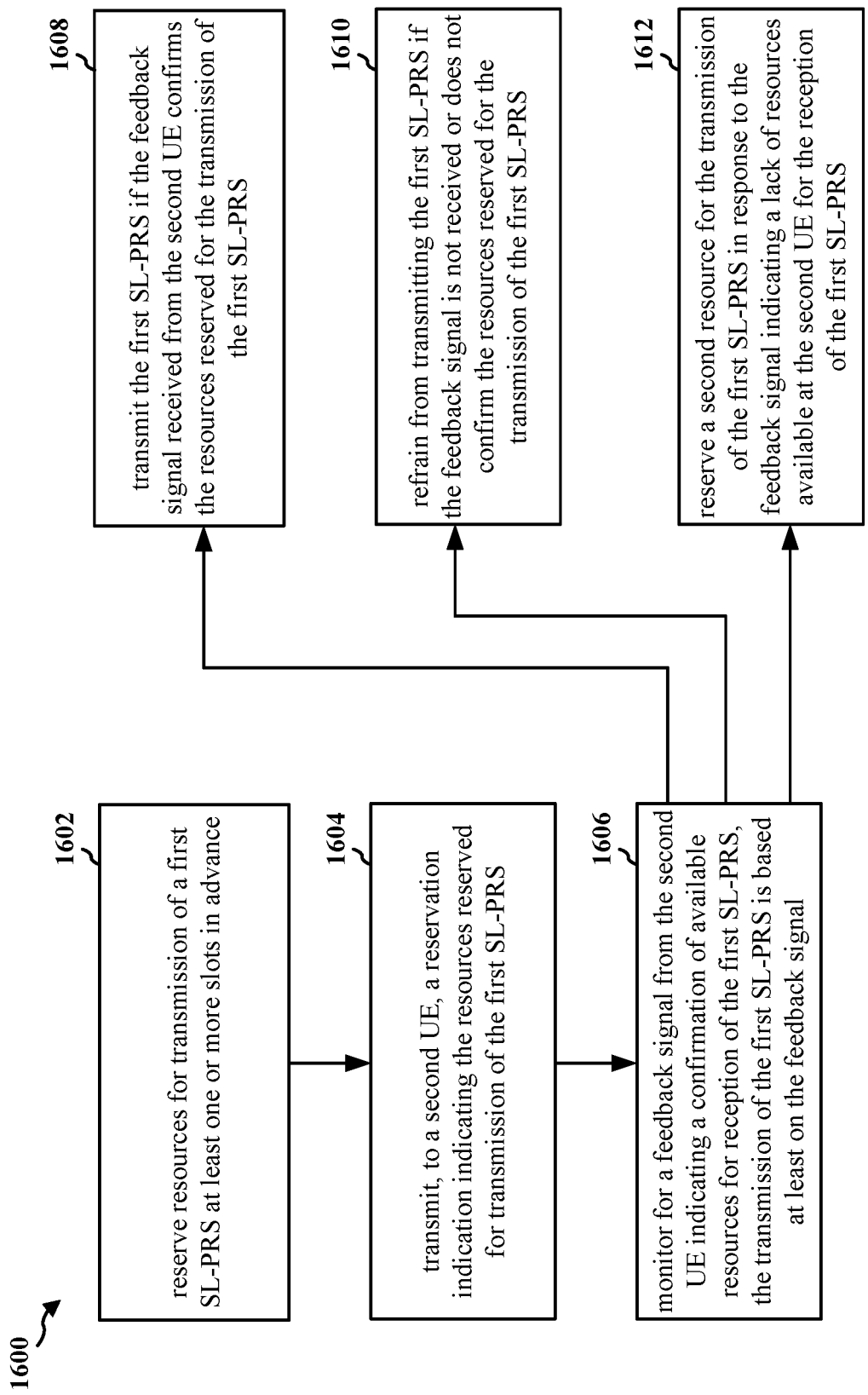
FIG. 16 is a fourth example of a flowchart of a method of wireless communication of the first UE.

FIG. 16 is a flowchart 1600 of a method of wireless communication. The method may be performed by a UE or a component of a UE (e.g., the UE 104; the apparatus 1702). One or more of the illustrated operations may be omitted, transposed, or contemporaneous. The method may allow a first UE to initiate a sidelink ranging procedure based on feedback from a second UE.

At 1602, the first UE may reserve resources for transmission of a first SL-PRS. For example, 1602 may be performed by resources component 1740 of apparatus 1702. The first UE may reserve the resources for the transmission of the first SL-PRS at least one or more slots in advance.

At 1604, the first UE may transmit a reservation indication indicating the resources reserved for transmission of the first SL-PRS. For example, 1604 may be performed by resources component 1740 of apparatus 1702. The first UE may transmit the reservation indication indicating the resources reserved for the transmission of the first SL-PRS to the second UE.

At 1606, the first UE may monitor for a feedback signal from the second UE. For example, 1606 may be performed by feedback component 1742 of apparatus 1702. The feedback signal from the second UE may indicate a confirmation of available resources for reception of the first SL-PRS at the second UE. The transmission of the first SL-PRS may be based at least on the feedback signal. In some aspects, the feedback signal may be comprised within at least one of a PSFCH, a PSSCH, or a PSCCH.

At 1608, the first UE may transmit the first SL-PRS. For example, 1608 may be performed by SL-PRS component 1744 of apparatus 1702. The first UE may transmit the first SL-PRS if the feedback signal received from the second UE confirms the resources reserved for the transmission of the first SL-PRS.

At 1610, the first UE may refrain from transmitting the first SL-PRS. For example, 1610 may be performed by SL-PRS component 1744 of apparatus 1702. The first UE may refrain from transmitting the first SL-PRS if the feedback signal is not received or does not confirm the resources reserved for the transmission of the first SL-PRS are available at the second UE.

At 1612, the first UE may reserve a second resource for the transmission of the first SL-PRS. For example, 1612 may be performed by resources component 1740 of apparatus 1702. The first UE may reserve the second resource for the transmission of the first SL-PRS in response to the feedback signal indicating a lack of resources available at the second UE for the reception of the first SL-PRS. In some aspects, the resources reserved for the transmission of the first SL-PRS may be considered as busy in response to the feedback signal indicating the lack of the resources available at the second UE for the reception of the first SL-PRS.

Figure 17:
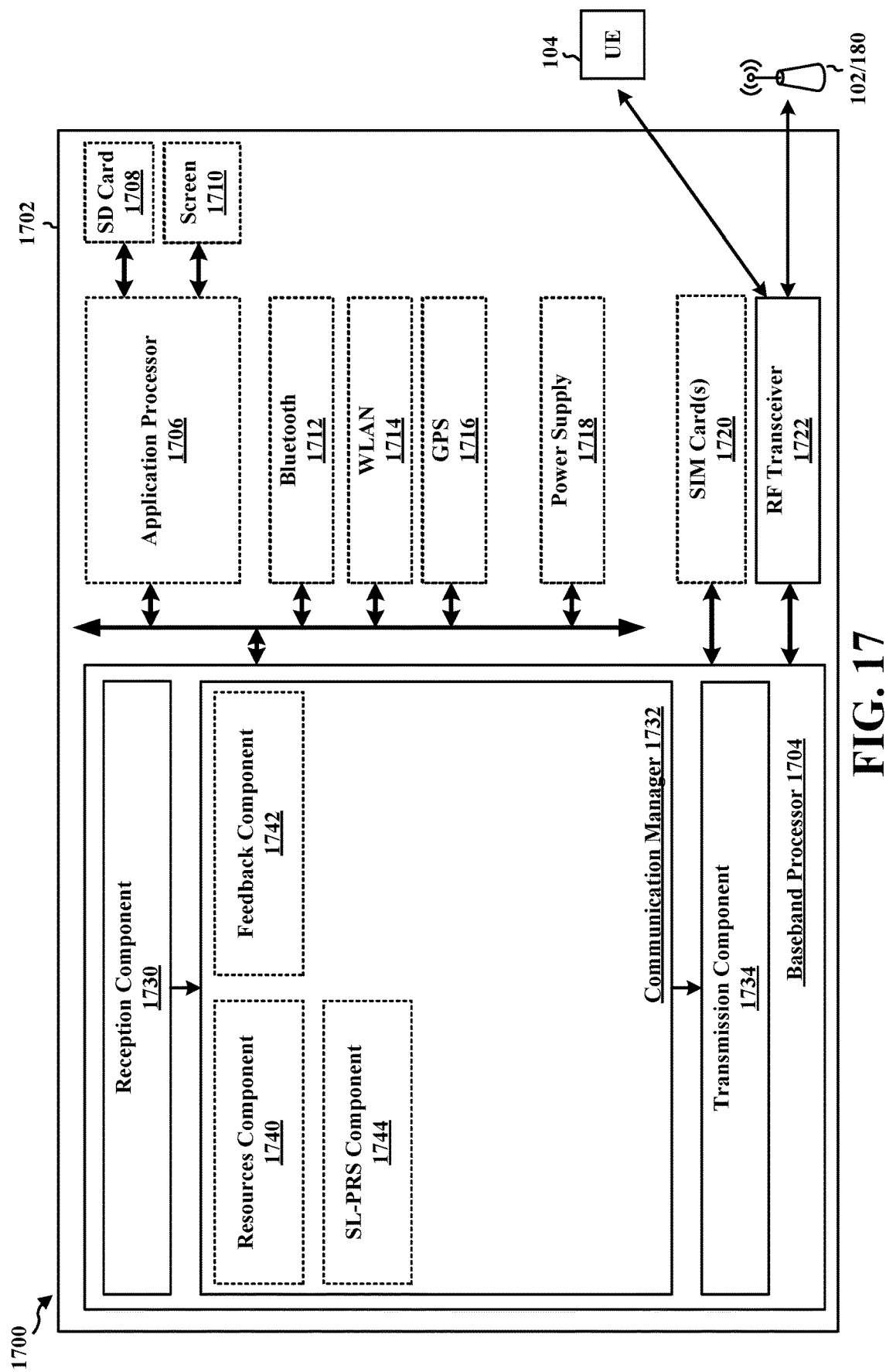
FIG. 17 is a diagram illustrating an example of a hardware implementation for an example apparatus of the first UE of FIG. 15 or FIG. 16.

FIG. 17 is a diagram 1700 illustrating an example of a hardware implementation for an apparatus 1702. The apparatus 1702 may be a UE, or another device configured to transmit and/or receive sidelink communication. The apparatus 1702 includes a baseband processor 1704 (also referred to as a modem) coupled to a RF transceiver 1722. In some aspects, the baseband processor 1704 may be a baseband processor and/or the RF transceiver 1722 may be a cellular RF transceiver. The apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and/or a power supply 1718. In some aspects, the baseband processor 1704 may comprise a cellular baseband processor that communicates through the RF transceiver 1722 with the UE 104 and/or BS 102/180. In some aspects, the baseband processor 1704 may comprise a processor or a non-cellular baseband processor. The baseband processor 1704 may include a computer-readable medium/memory. The computer-readable medium/memory may be non-transitory. The baseband processor 1704 is responsible for general processing, including the execution of software stored on the computer-readable medium/memory. The software, when executed by the baseband processor 1704, causes the baseband processor 1704 to perform the various functions described in the present application. The computer-readable medium/memory may also be used for storing data that is manipulated by the baseband processor 1704 when executing software. The baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband processor 1704. The baseband processor 1704 may be a component of the device 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes a resources component 1740 that is configured to reserve resources for transmission of a first SL-PRS, e.g., as described in connection with 1502 of FIG. 15 or 1602 of FIG. 16. The resources component 1740 may be further configured to transmit a reservation indication indicating the resources reserved for transmission of the first SL-PRS, e.g., as described in connection with 1504 of FIG. 15 or 1604 of FIG. 16. The resources component 1740 may be further configured to reserve a second resource for the transmission of the first SL-PRS, e.g., as described in connection with 1612 of FIG. 16. The communication manager 1732 further includes a feedback component 1742 that is configured to monitor for a feedback signal from the second UE, e.g., as described in connection with 1506 of FIG. 15 or 1606 of FIG. 16. The communication manager 1732 further includes an SL-PRS component 1744 that is configured to transmit the first SL-PRS, e.g., as described in connection with 1608 of FIG. 16. The SL-PRS component 1744 may be further configured to refrain from transmitting the first SL-PRS, e.g., as described in connection with 1610 of FIG. 16.

The apparatus may include additional components that perform each of the blocks of the algorithm in the flowcharts of FIGS. 15 and 16. As such, each block in the flowcharts of FIGS. 15 and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband processor 1704, includes means for reserving resources for transmission of a first SL-PRS at least one or more slots in advance. The apparatus includes means for transmitting, to a second UE, a reservation indication indicating the resources reserved for transmission of the first SL-PRS. The apparatus includes means for monitoring for a feedback signal from the second UE indicating a confirmation of available resources for reception of the first SL-PRS. The transmission of the first SL-PRS is based at least on the feedback signal. The apparatus further includes means for transmitting the first SL-PRS if the feedback signal received from the second UE confirms the resources reserved for the transmission of the first SL-PRS. The apparatus further includes means for refraining from transmitting the first SL-PRS if the feedback signal is not received or does not confirm the resources reserved for the transmission of the first SL-PRS. The apparatus further includes means for reserving a second resource for the transmission of the first SL-PRS in response to the feedback signal indicating a lack of resources available at the second UE for the reception of the first SL-PRS. The resources reserved for the transmission of the first SL-PRS are considered as busy in response to the feedback signal indicating the lack of the resources available at the second UE for the reception of the first SL-PRS. The means may be one or more of the components of the apparatus 1702 configured to perform the functions recited by the means. As described herein, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
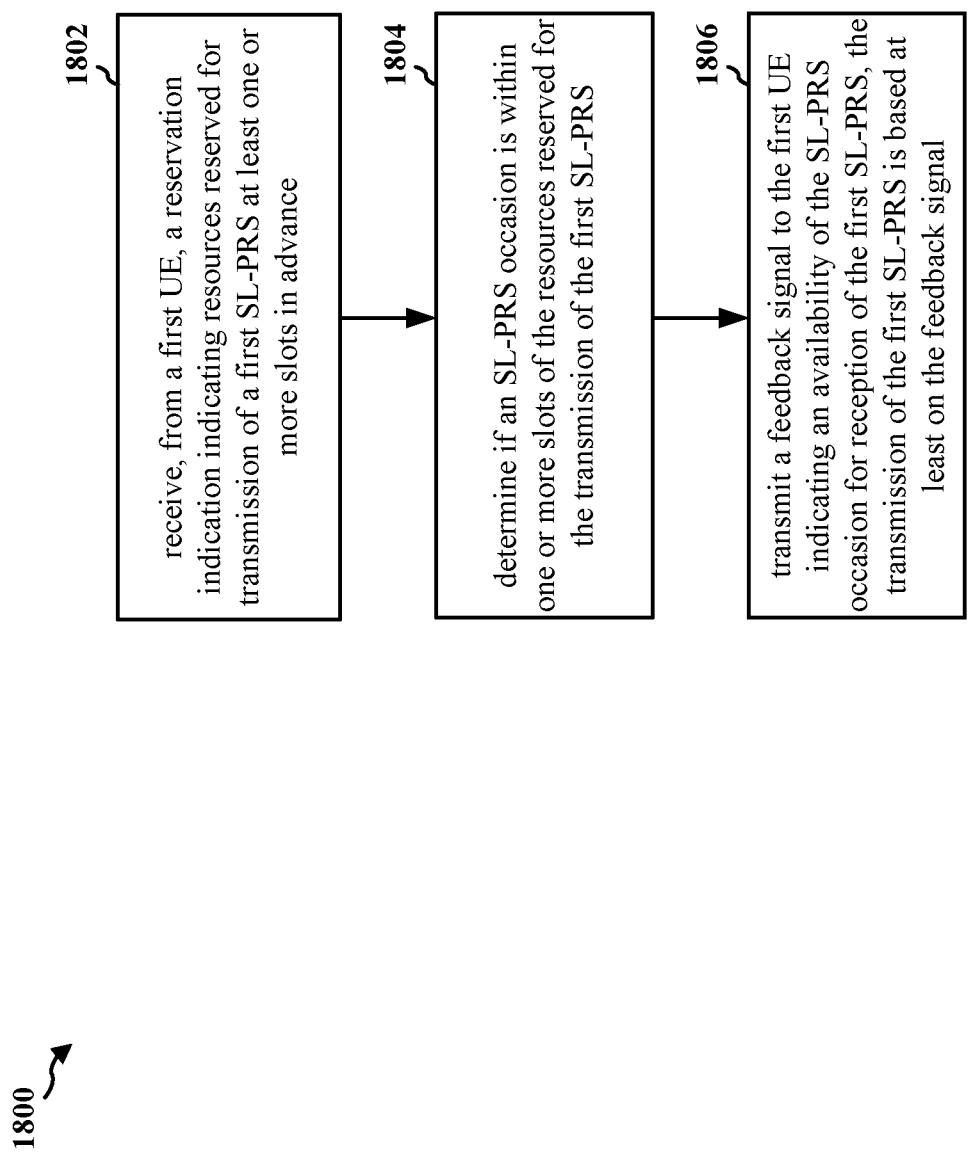
FIG. 18 is a third example of a flowchart of a method of wireless communication of the second UE.

FIG. 18 is a flowchart 1800 of a method of wireless communication. The method may be performed by a UE or a component of a UE (e.g., the UE 104; the apparatus 2002). One or more of the illustrated operations may be omitted, transposed, or contemporaneous. The method may allow a second UE to transmit feedback to a first UE in preparation of a first UE initiating a sidelink ranging procedure.

At 1802, the second UE may receive a reservation indication indicating resources reserved for transmission of a first SL-PRS. For example, 1802 may be performed by resources component 2040 of apparatus 2002. The second UE may receive the reservation indication indicating resources reserved for transmission of the first SL-PRS from a first UE. The second UE may receive a reservation indication indicating resources reserved for transmission of a first SL-PRS from the first UE at least one or more slots in advance of the scheduled transmission of the first SL-PRS.

At 1804, the second UE may determine if an SL-PRS occasion is within one or more slots of the resources reserved for the transmission of the first SL-PRS. For example, 1804 may be performed by resources component 2040 of apparatus 2002.

At 1806, the second UE may transmit a feedback signal indicating an availability of the SL-PRS occasion for reception of the first SL-PRS. For example, 1806 may be performed by feedback component 2042 of apparatus 2002. The second UE may transmit the feedback signal to the first UE. The transmission of the first SL-PRS, by the first UE, may be based at least on the feedback signal from the second UE. In some aspects, the feedback signal may be comprised within at least one of a PSFCH, a PSSCH, or a PSCCH. In some aspects, the feedback signal may indicate a lack of the availability of the SL-PRS occasion for the reception of the first SL-PRS.

Figure 19:
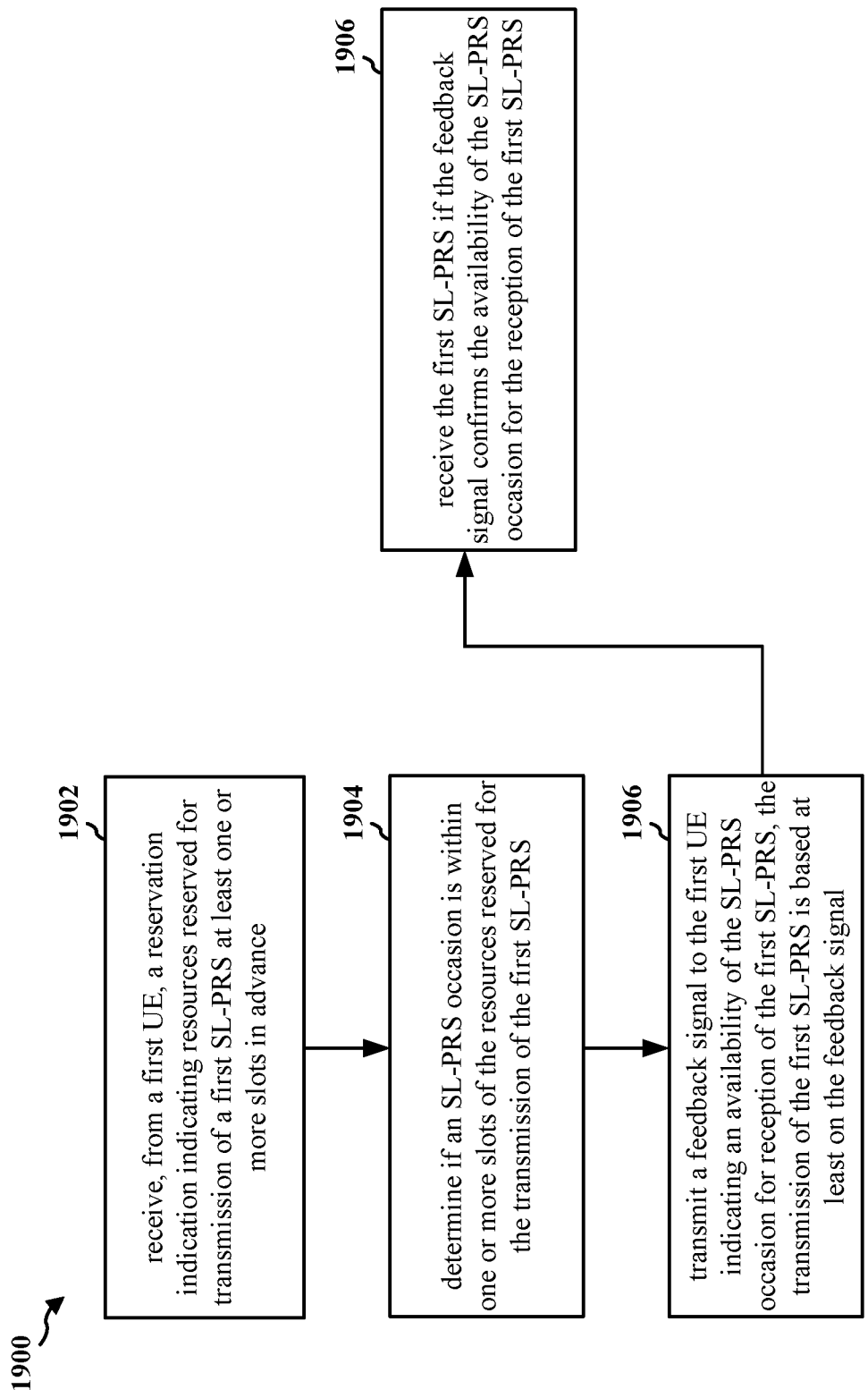
FIG. 19 is a fourth example of a flowchart of a method of wireless communication of the second UE.

FIG. 19 is a flowchart 1900 of a method of wireless communication. The method may be performed by a UE or a component of a UE (e.g., the UE 104; the apparatus 2002). One or more of the illustrated operations may be omitted, transposed, or contemporaneous. The method may allow a second UE to transmit feedback to a first UE in preparation of a first UE initiating a sidelink ranging procedure.

At 1902, the second UE may receive a reservation indication indicating resources reserved for transmission of a first SL-PRS. For example, 1902 may be performed by resources component 2040 of apparatus 2002. The second UE may receive the reservation indication indicating resources reserved for transmission of the first SL-PRS from a first UE. The second UE may receive a reservation indication indicating resources reserved for transmission of a first SL-PRS from the first UE at least one or more slots in advance of the scheduled transmission of the first SL-PRS.

At 1904, the second UE may determine if an SL-PRS occasion is within one or more slots of the resources reserved for the transmission of the first SL-PRS. For example, 1904 may be performed by resources component 2040 of apparatus 2002.

At 1906, the second UE may transmit a feedback signal indicating an availability of the SL-PRS occasion for reception of the first SL-PRS. For example, 1906 may be performed by feedback component 2042 of apparatus 2002. The second UE may transmit the feedback signal to the first UE. The transmission of the first SL-PRS, by the first UE, may be based at least on the feedback signal from the second UE. In some aspects, the feedback signal may be comprised within at least one of a PSFCH, a PSSCH, or a PSCCH. In some aspects, the feedback signal may indicate a lack of the availability of the SL-PRS occasion for the reception of the first SL-PRS.

At 1908, the second UE may receive the first SL-PRS. For example, 1908 may be performed by SL-PRS component 2044 of apparatus 2002. The second UE may receive the first SL-PRS if the feedback signal confirms the availability of the SL-PRS occasion for the reception of the first SL-PRS.

Figure 20:
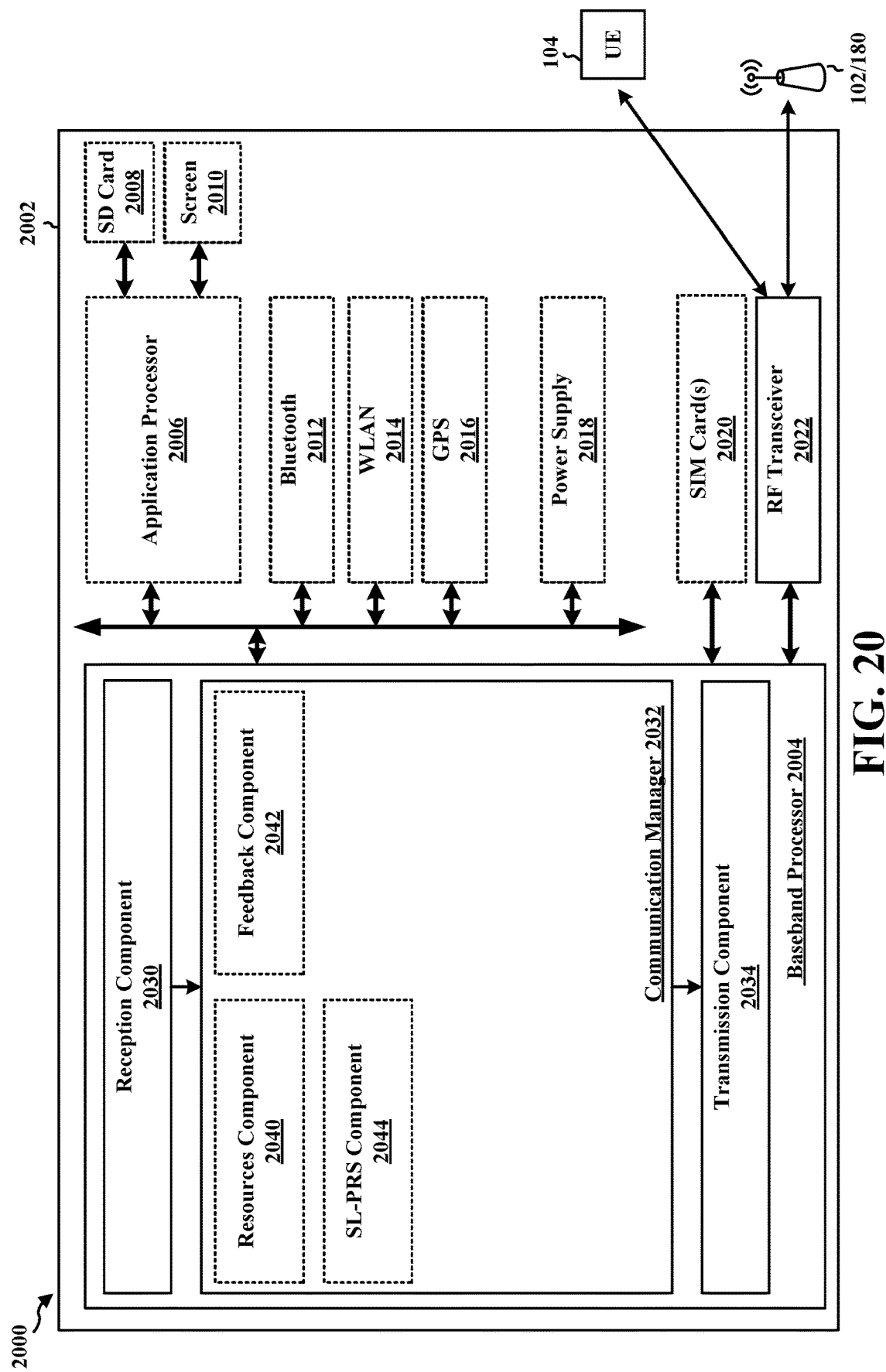
FIG. 20 is a diagram illustrating an example of a hardware implementation for an example apparatus of the second UE of FIG. 18 or FIG. 19.

FIG. 20 is a diagram 2000 illustrating an example of a hardware implementation for an apparatus 2002. The apparatus 2002 may be a UE, or another device configured to transmit and/or receive sidelink communication. The apparatus 2002 includes a baseband processor 2004 (also referred to as a modem) coupled to a RF transceiver 2022. In some aspects, the baseband processor 2004 may be a baseband processor and/or the RF transceiver 2022 may be a cellular RF transceiver. The apparatus 2002 may further include one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, and/or a power supply 2018. In some aspects, the baseband processor 2004 may comprise a cellular baseband processor that communicates through the RF transceiver 2022 with the UE 104 and/or BS 102/180. In some aspects, the baseband processor 2004 may comprise a processor or a non-cellular baseband processor. The baseband processor 2004 may include a computer-readable medium/memory. The computer-readable medium/memory may be non-transitory. The baseband processor 2004 is responsible for general processing, including the execution of software stored on the computer-readable medium/memory. The software, when executed by the baseband processor 2004, causes the baseband processor 2004 to perform the various functions described in the present application. The computer-readable medium/memory may also be used for storing data that is manipulated by the baseband processor 2004 when executing software. The baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the baseband processor 2004. The baseband processor 2004 may be a component of the device 350 and may include the memory 360 and/or at least one of the TX processor 368, the RX processor 356, and the controller/processor 359. In one configuration, the apparatus 2002 may be a modem chip and include just the baseband processor 2004, and in another configuration, the apparatus 2002 may be the entire UE (e.g., see 350 of FIG. 3) and include the additional modules of the apparatus 2002.

The communication manager 2032 includes a resources component 2040 that is configured to receive a reservation indication indicating resources reserved for transmission of a first SL-PRS, e.g., as described in connection with 1802 of FIG. 18 or 1902 of FIG. 19. The resources component 2040 may be further configured to determine if an SL-PRS occasion is within one or more slots of the resources reserved for the transmission of the first SL-PRS, e.g., as described in connection with 1804 of FIG. 18 or 1904 of FIG. 19. The communication manager 2032 further includes a feedback component 2042 that is configured to transmit a feedback signal indicating an availability of the SL-PRS occasion for reception of the first SL-PRS, e.g., as described in connection with 1806 of FIG. 18 or 1906 of FIG. 19. The communication manager 2032 further includes an SL-PRS component 2044 that is configured to receive the first SL-PRS, e.g., as described in connection with 1908 of FIG. 19.

The apparatus may include additional components that perform each of the blocks of the algorithm in the flowcharts of FIGS. 18 and 19. As such, each block in the flowcharts of FIGS. 18 and 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the baseband processor 2004, includes means for receiving, from a first UE, a reservation indication indicating resources reserved for transmission of a first SL-PRS at least one or more slots in advance. The apparatus includes means for determining if an SL-PRS occasion is within one or more slots of the resources reserved for the transmission of the first SL-PRS. The apparatus includes means for transmitting a feedback signal to the first UE indicating an availability of the SL-PRS occasion for reception of the first SL-PRS. The transmission of the first SL-PRS is based at least on the feedback signal. The apparatus further includes means for receiving the first SL-PRS if the feedback signal confirms the availability of the SL-PRS occasion for the reception of the first SL-PRS. The means may be one or more of the components of the apparatus 2002 configured to perform the functions recited by the means. As described herein, the apparatus 2002 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and at least one transceiver, the at least one processor configured to reserve resources for transmission of a first SL-PRS in a first time slot; transmit, to a second UE, the first SL-PRS within the first time slot; receive, from the second UE, a second SL-PRS at a second time based on the first time slot and a response time associated with transmission of the second SL-PRS in response to the first SL-PRS; and measure a time difference between the transmission of the first SL-PRS and reception of the second SL-PRS to determine if a third SL-PRS is to be transmitted to the second UE.

Aspect 2 is the apparatus of aspect 1, further includes that the at least one processor is further configured to transmit, to the second UE, the third SL-PRS if a value of the response time exceeds a threshold.

Aspect 3 is the apparatus of any of aspects 1 and 2, further includes that the at least one processor is further configured to reserve resources for transmission of the third SL-PRS based on the time difference between the transmission of the first SL-PRS and the reception of the second SL-PRS exceeding the threshold; and transmit, to the second UE, an indication indicating that the third SL-PRS is scheduled for transmission.

Aspect 4 is the apparatus of any of aspects 1-3, further includes that the at least one processor is further configured to receive, from the second UE, an indication comprising measurements of the time based on the transmission or the reception of the first SL-PRS, the second SL-PRS, or the third SL-PRS, wherein the measurements of the time at least comprise measurements of the first time slot or the response time.

Aspect 5 is the apparatus of any of aspects 1-4, further includes that the resources reserved for the transmission of the first SL-PRS are considered as busy based on the time difference between the transmission of the first SL-PRS and the reception of the second SL-PRS exceeding the threshold.

Aspect 6 is the apparatus of any of aspects 1-5, further includes that the value of the response time and a value of the first time slot are based on an actual slot of the transmission of the first SL-PRS.

Aspect 7 is the apparatus of any of aspects 1-6, further includes that the transmission or the reception of the first SL-PRS, the second SL-PRS, or the third SL-PRS allows for estimation of clock drift between the first UE and the second UE, wherein the clock drift is corrected based on propagation time of the first SL-PRS, the second SL-PRS, or the third SL-PRS between the first UE and the second UE.

Aspect 8 is the apparatus of any of aspects 1-7, further includes that the third SL-PRS is not transmitted if a value of the response time is within a threshold.

Aspect 9 is the apparatus of any of aspects 1-8, further includes that the transmission or the reception of the first SL-PRS or the second SL-PRS allows for estimation of clock drift between the first UE and the second UE, wherein the clock drift is corrected based on propagation time of the first SL-PRS or the second SL-PRS between the first UE and the second UE.

Aspect 10 is the apparatus of any of aspects 1-9, further includes that values for the first time slot or the response time are configured by a network, wherein values for the first time slot or the response time are negotiated between the first UE and the second UE during a connection setup procedure.

Aspect 11 is a method of wireless communication for implementing any of aspects 1-10.

Aspect 12 is an apparatus for wireless communication including means for implementing any of aspects 1-10.

Aspect 13 is a computer-readable medium storing computer executable code, where the code when executed by a processor causes the processor to implement any of aspects 1-10.

Aspect 14 is an apparatus for wireless communication at a second UE including at least one processor coupled to a memory and at least one transceiver, the at least one processor configured to receive, from a first UE, a first SL-PRS transmitted in a first time slot; reserve resources for transmission of a second SL-PRS at a second time in response to reception of the first SL-PRS; transmit, to the first UE, the second SL-PRS within the second time based on the first time slot and a response time associated with transmission of the second SL-PRS; and measure a time difference between the reception of the first SL-PRS and the transmission of the second SL-PRS to determine if a third SL-PRS is to be transmitted by the first UE.

Aspect 15 is the apparatus of aspect 14, further includes that the at least one processor is further configured to receive, from the first UE, the third SL-PRS if a value of the response time exceeds a threshold.

Aspect 16 is the apparatus of any of aspects 14 and 15, further includes that the at least one processor is further configured to receive, from the first UE, an indication indicating that the third SL-PRS is scheduled for transmission based on the time difference between the reception of the first SL-PRS and the transmission of the second SL-PRS exceeding the threshold.

Aspect 17 is the apparatus of any of aspects 14-16, further includes that the at least one processor is further configured to transmit, to the first UE, an indication comprising measurements of the time based on the transmission or the reception of the first SL-PRS, the second SL-PRS, or the third SL-PRS.

Aspect 18 is the apparatus of any of aspects 14-17, further includes that the measurements of the time at least comprise measurements of the first time slot or the response time.

Aspect 19 is the apparatus of any of aspects 14-18, further includes that the value of the response time and a value of the first time slot are based on an actual slot of the transmission of the first SL-PRS.

Aspect 20 is the apparatus of any of aspects 14-19, further includes that the transmission or the reception of the first SL-PRS, the second SL-PRS, or the third SL-PRS allows for estimation of clock drift between the first UE and the second UE, wherein the clock drift is corrected based on propagation time of the first SL-PRS, the second SL-PRS, or the third SL-PRS between the first UE and the second UE.

Aspect 21 is the apparatus of any of aspects 14-20, further includes that the third SL-PRS is not transmitted by the first UE if a value of the response time is within a threshold.

Aspect 22 is the apparatus of any of aspects 14-21, further includes that the transmission or the reception of the first SL-PRS or the second SL-PRS allows for estimation of clock drift between the first UE and the second UE, wherein the clock drift is corrected based on propagation time of the first SL-PRS or the second SL-PRS between the first UE and the second UE.

Aspect 23 is the apparatus of any of aspects 14-22, further includes that values for the first time slot or the response time are configured by a network.

Aspect 24 is the apparatus of any of aspects 14-23, further includes that the values of the first time slot or the response time are configured by the network for at least one of the first UE or the second UE or both, wherein the values for the first time slot or the response time are negotiated between the first UE and the second UE during a connection setup procedure.

Aspect 25 is a method of wireless communication for implementing any of aspects 14-24.

Aspect 26 is an apparatus for wireless communication including means for implementing any of aspects 14-24.

Aspect 27 is a computer-readable medium storing computer executable code, where the code when executed by a processor causes the processor to implement any of aspects 14-24.

Aspect 28 is an apparatus for wireless communication at a first UE including at least one processor coupled to a memory and at least one transceiver, the at least one processor configured to reserve resources for transmission of a first SL-PRS at least one or more slots in advance; transmit, to a second UE, a reservation indication indicating the resources reserved for the transmission of the first SL-PRS; and monitor for a feedback signal from the second UE indicating a confirmation of available resources for reception of the first SL-PRS, wherein the transmission of the first SL-PRS is based at least on the feedback signal.

Aspect 29 is the apparatus of aspect 28, further includes that the at least one processor is further configured to transmit the first SL-PRS if the feedback signal received from the second UE confirms the resources reserved for the transmission of the first SL-PRS.

Aspect 30 is the apparatus of any of aspects 28 and 29, further includes that the at least one processor is further configured to refrain from transmitting the first SL-PRS if the feedback signal is not received or does not confirm the resources reserved for the transmission of the first SL-PRS.

Aspect 31 is the apparatus of any of aspects 28-30, further includes that the feedback signal is comprised within at least one of a PSFCH, a PSSCH, or a PSCCH.

Aspect 32 is the apparatus of any of aspects 28-31, further includes that the at least one processor is further configured to reserve a second resource for the transmission of the first SL-PRS in response to the feedback signal indicating a lack of resources available at the second UE for the reception of the first SL-PRS, wherein the resources reserved for the transmission of the first SL-PRS are considered as busy in response to the feedback signal indicating the lack of the resources available at the second UE for the reception of the first SL-PRS.

Aspect 33 is a method of wireless communication for implementing any of aspects 28-32.

Aspect 34 is an apparatus for wireless communication including means for implementing any of aspects 28-32.

Aspect 35 is a computer-readable medium storing computer executable code, where the code when executed by a processor causes the processor to implement any of aspects 28-32.

Aspect 36 is an apparatus for wireless communication at a second UE including at least one processor coupled to a memory and at least one transceiver, the at least one processor configured to receive, from a first UE, a reservation indication indicating resources reserved for transmission of a first SL-PRS at least one or more slots in advance; determine if an SL-PRS occasion is within one or more slots of the resources reserved for the transmission of the first SL-PRS; and transmit a feedback signal to the first UE indicating an availability of the SL-PRS occasion for reception of the first SL-PRS, wherein the transmission of the first SL-PRS is based at least on the feedback signal.

Aspect 37 is the apparatus of aspect 36, further includes that the at least one processor is further configured to receive the first SL-PRS if the feedback signal confirms the availability of the SL-PRS occasion for the reception of the first SL-PRS.

Aspect 38 is the apparatus of any of aspects 36 and 37, further includes that the feedback signal is comprised within at least one of a PSFCH, a PSSCH, or a PSCCH.

Aspect 39 is the apparatus of any of aspects 36-38, further includes that the feedback signal indicates a lack of the availability of the SL-PRS occasion for the reception of the first SL-PRS.

Aspect 40 is a method of wireless communication for implementing any of aspects 36-39.

Aspect 41 is an apparatus for wireless communication including means for implementing any of aspects 36-39.

Aspect 42 is a computer-readable medium storing computer executable code, where the code when executed by a processor causes the processor to implement any of aspects 36-39.

What is claimed is:

1. An apparatus for wireless communication at a first user equipment (UE), comprising:
    a memory;
    at least one transceiver; and
    at least one processor coupled to the memory and the at least one transceiver, the at least one processor configured to:
        reserve resources for transmission of a first sidelink positioning reference signal (SL-PRS) in a first time slot;
        transmit, to a second UE, the first SL-PRS within the first time slot;
        receive, from the second UE, a second SL-PRS at a second time based on the first time slot and a response time associated with transmission of the second SL-PRS in response to the first SL-PRS;
        measure a time difference between the transmission of the first SL-PRS and reception of the second SL-PRS to determine if a third SL-PRS is to be transmitted to the second UE; and
        transmit, to the second UE, the third SL-PRS if a value of the response time exceeds a threshold.

2. The apparatus of claim 1, wherein the at least one processor is further configured to:
    reserve resources for transmission of the third SL-PRS based on the time difference between the transmission of the first SL-PRS and the reception of the second SL-PRS exceeding the threshold; and
    transmit, to the second UE, an indication indicating that the third SL-PRS is scheduled for transmission.

3. The apparatus of claim 1, wherein the at least one processor is further configured to:
    receive, from the second UE, an indication comprising measurements of the time based on the transmission or the reception of the first SL-PRS, the second SL-PRS, or the third SL-PRS, wherein the measurements of the time at least comprise measurements of the first time slot or the response time.

4. The apparatus of claim 1, wherein the resources reserved for the transmission of the first SL-PRS are considered as busy based on the time difference between the transmission of the first SL-PRS and the reception of the second SL-PRS exceeding the threshold.

5. The apparatus of claim 1, wherein the value of the response time and a value of the first time slot are based on an actual slot of the transmission of the first SL-PRS.

6. The apparatus of claim 1, wherein the transmission or the reception of the first SL-PRS, the second SL-PRS, or the third SL-PRS allows for estimation of clock drift between the first UE and the second UE, wherein the clock drift is corrected based on propagation time of the first SL-PRS, the second SL-PRS, or the third SL-PRS between the first UE and the second UE.

7. The apparatus of claim 1, wherein the third SL-PRS is not transmitted if a value of the response time is within a threshold.

8. The apparatus of claim 1, wherein the transmission or the reception of the first SL-PRS or the second SL-PRS allows for estimation of clock drift between the first UE and the second UE, wherein the clock drift is corrected based on propagation time of the first SL-PRS or the second SL-PRS between the first UE and the second UE.

9. The apparatus of claim 1, wherein values for the first time slot or the response time are configured by a network, wherein values for the first time slot or the response time are negotiated between the first UE and the second UE during a connection setup procedure.

10. An apparatus for wireless communication at a second user equipment (UE), comprising:
    a memory;
    at least one transceiver; and
    at least one processor coupled to the memory and the at least one transceiver, the at least one processor configured to:
        receive, from a first UE, a first sidelink positioning reference signal (SL-PRS) transmitted in a first time slot;
        reserve resources for transmission of a second SL-PRS at a second time in response to reception of the first SL-PRS;
        transmit, to the first UE, the second SL-PRS within the second time based on the first time slot and a response time associated with transmission of the second SL-PRS;
        measure a time difference between the reception of the first SL-PRS and the transmission of the second SL-PRS to determine if a third SL-PRS is to be transmitted by the first UE; and
        receive, from the first UE, the third SL-PRS if a value of the response time exceeds a threshold.

11. The apparatus of claim 10, wherein the at least one processor is further configured to:
    receive, from the first UE, an indication indicating that the third SL-PRS is scheduled for transmission based on the time difference between the reception of the first SL-PRS and the transmission of the second SL-PRS exceeding the threshold.

12. The apparatus of claim 10, wherein the at least one processor is further configured to:
transmit, to the first UE, an indication comprising measurements of the time based on the transmission or the reception of the first SL-PRS, the second SL-PRS, or the third SL-PRS.

13. The apparatus of claim 12, wherein the measurements of the time at least comprise measurements of the first time slot or the response time.

14. The apparatus of claim 10, wherein the value of the response time and a value of the first time slot are based on an actual slot of the transmission of the first SL-PRS.

15. The apparatus of claim 10, wherein the transmission or the reception of the first SL-PRS, the second SL-PRS, or the third SL-PRS allows for estimation of clock drift between the first UE and the second UE, wherein the clock drift is corrected based on propagation time of the first SL-PRS, the second SL-PRS, or the third SL-PRS between the first UE and the second UE.

16. The apparatus of claim 10, wherein the third SL-PRS is not transmitted by the first UE if a value of the response time is within a threshold.

17. The apparatus of claim 10, wherein the transmission or the reception of the first SL-PRS or the second SL-PRS allows for estimation of clock drift between the first UE and the second UE, wherein the clock drift is corrected based on propagation time of the first SL-PRS or the second SL-PRS between the first UE and the second UE.

18. The apparatus of claim 10, wherein values for the first time slot or the response time are configured by a network.

19. The apparatus of claim 18, wherein the values of the first time slot or the response time are configured by the network for at least one of the first UE or the second UE or both, wherein the values for n or k are negotiated between the first UE and the second UE during a connection setup procedure, wherein n corresponds to the first time slot, and k corresponds to a response time for reserving the resources at the second time.

* * * * *